United States Patent
Choi et al.

(10) Patent No.: US 10,598,161 B2
(45) Date of Patent: Mar. 24, 2020

(54) GENERATOR AND MOBILE DEVICE HAVING THE SAME

(71) Applicant: University-Industry Cooperation Group of Kyung Hee University, Yongin-si, Gyeonggi-do (KR)

(72) Inventors: Dukhyun Choi, Suwon-si (KR); Wook Kim, Yongin-si (KR)

(73) Assignee: University-Industry Cooperation Group of Kyung Hee University, Yongin-si (KR)

( * ) Notice: Subject to any disclaimer, the term of this patent is extended or adjusted under 35 U.S.C. 154(b) by 665 days.

(21) Appl. No.: 15/402,623

(22) Filed: Jan. 10, 2017

(65) Prior Publication Data
US 2018/0149143 A1 May 31, 2018

(30) Foreign Application Priority Data
Nov. 25, 2016 (KR) .......................... 10-2016-0158244

(51) Int. Cl.
| | | |
|---|---|---|
| *F03G 7/08* | (2006.01) | |
| *F03D 15/10* | (2016.01) | |
| *F03D 9/25* | (2016.01) | |
| *F03D 3/00* | (2006.01) | |
| *H02N 1/08* | (2006.01) | |
| *H02K 7/116* | (2006.01) | |
| *H02K 7/18* | (2006.01) | |

(52) U.S. Cl.
CPC ................. *F03G 7/08* (2013.01); *F03D 3/00* (2013.01); *F03D 9/25* (2016.05); *F03D 15/10* (2016.05); *H02N 1/08* (2013.01); *H02K 7/116* (2013.01); *H02K 7/183* (2013.01); *Y02E 10/725* (2013.01)

(58) Field of Classification Search
CPC ........... F03D 9/25; H02K 7/116; H02K 7/183
USPC ............................... 310/12.13, 80, 83, 102 R
See application file for complete search history.

(56) References Cited

U.S. PATENT DOCUMENTS

| | | | | |
|---|---|---|---|---|
| 6,097,675 | A * | 8/2000 | Takahashi | G04C 10/00 310/191 |
| 7,031,230 | B1 * | 4/2006 | Nagasaka | G04B 27/04 368/204 |
| 8,519,596 | B1 | 8/2013 | Kim et al. | |
| 8,536,760 | B1 | 9/2013 | Kim et al. | |
| 8,580,098 | B1 | 11/2013 | Munson et al. | |

(Continued)

FOREIGN PATENT DOCUMENTS

| | | |
|---|---|---|
| CN | 104373295 A | 2/2015 |
| JP | 2012-115118 A | 6/2012 |

(Continued)

OTHER PUBLICATIONS

"Kinematic design for high performance triboelectric nanogenerators with enhanced working frequency", Nano Energy (2016) 21, 19-25, Kim et al., Jan. 13, 2016.

(Continued)

*Primary Examiner* — Gary A Nash
(74) *Attorney, Agent, or Firm* — Jefferson IP Law, LLP

(57) ABSTRACT

A generator is provided. The generator includes a barrel rotated by being applied with a driving force from an external force, a converter applied with a torque of the barrel to rotate a rotating shaft at a constant rotation speed; and an electrostatic generator driven by being applied with the torque from the rotation shaft.

19 Claims, 13 Drawing Sheets

(56) References Cited

U.S. PATENT DOCUMENTS

| | | | |
|---|---|---|---|
| 8,810,049 B2 | 8/2014 | McCowen | |
| 9,178,446 B2 | 11/2015 | Wang et al. | |
| 9,331,603 B2 | 5/2016 | McCowen | |
| 9,394,875 B2 | 7/2016 | Wang et al. | |
| 2004/0178685 A1* | 9/2004 | Abe | H02K 7/116 310/49.01 |
| 2009/0066177 A1* | 3/2009 | Loke | H02K 7/1853 310/83 |
| 2012/0004071 A1* | 1/2012 | Ha | B60K 6/48 475/302 |
| 2013/0069487 A1 | 3/2013 | Houser | |
| 2014/0084748 A1 | 3/2014 | Wang et al. | |
| 2014/0292138 A1 | 10/2014 | Wang et al. | |
| 2017/0133952 A1 | 5/2017 | Matsumoto et al. | |

FOREIGN PATENT DOCUMENTS

| | | |
|---|---|---|
| KR | 20-0435711 Y1 | 2/2007 |
| KR | 10-2013-0124234 A | 11/2013 |
| KR | 10-2015-0144154 A | 12/2015 |
| WO | 2015/146806 A1 | 4/2017 |

OTHER PUBLICATIONS

Teng Lin et al., Final Report Energy Harvesting from Rail Track for Transportation Safety and Monitoring, Unitersity Transportation Research Center—Region 2, Performing Organization: Stony Brook, State University of New York, Feb. 2014.
Korean Office Action dated Nov. 7, 2017, issued in the Korean Application No. 10-2016-0158244 dated Nov. 25, 2016.

* cited by examiner

GENERATOR AND MOBILE DEVICE HAVING THE SAME

CROSS-REFERENCE TO RELATED APPLICATIONS

This application claims priority from Korean Patent Application No. 10-2016-0158244, filed on Nov. 25, 2016 in the Korean Intellectual Property Office, the disclosure of which is incorporated herein by reference in its entirety.

BACKGROUND OF THE INVENTION

Field of the Invention

Apparatuses and methods consistent with the present disclosure relate to a generator capable of stably producing required electric power and a mobile device having the same.

Description of the Related Art

There is a disadvantage in that the typical generators that produce electric power using thermal energy generated by burning fossil fuels discharge pollutants during the power generation.

As substitutes for the fossil fuels, eco-friendly generators using solar power, water power, wind power, or the like that exist in nature have been widely used. However, there is a limitation in that the existing solar power, water power, and wind power generators cannot but be manufactured in a large size in consideration of power generation efficiency and installation cost.

In recent years, energy harvesting technology capable of utilizing abandoned energy existing not only in nature but also in the living environment has been developed. Generators adopting the energy harvesting technology produce electric power by utilizing a piezoelectric effect that generates a voltage by applying a physical pressure, an electrostatic effect that generates a voltage by friction charging, and a thermoelectric effect that flows a current through a temperature difference, etc., or produce electric power by utilizing vibration energy that is generated from a motion of a human body, vibration and heat generated from roads or railway lines with a high traffic volume of vehicles and trains, etc. However, the typical generators adopting the energy harvesting technology have difficulty in continuously producing the required constant generation when an inflow amount of energy from the outside is not uniform.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present disclosure provides a generator capable of uniformly producing required electric power by utilizing energy existing at the outside as driving power and a mobile device having the same.

According to an aspect of the present disclosure, a generator includes: a barrel rotated by being applied with driving power from the outside; a converter applied with a torque of the barrel to rotate a rotating shaft at a constant rotation speed; and an electrostatic generator driven by being applied with the torque from the rotation shaft.

The converter may include: a plurality of gear sets disposed within the barrel to be connected to the rotation shaft and having different gear ratios; and a plurality of connection members selectively connecting between any one of the plurality of gear sets and the barrel.

The plurality of gear sets may include first and second gear sets, the first gear set may include a first sun gear coupled with the rotation shaft, a plurality of first planetary gears meshed with the first sun gear, and a first ring gear meshed with the plurality of first planetary gears, and the second gear set may include a second sun gear coupled with the rotation shaft and a second ring gear meshed with the second sun gear.

The first and second ring gears may be an internal gear having the same diameter and the first sun gear, the second sun gear, and the first planetary gear may be a spur gear having different diameters.

The first gear set may include a first carrier with which the plurality of first planetary gears each are rotatably coupled and the first carrier may be fixed to an outside of the barrel.

The plurality of gear sets may further include a third gear set including a third sun gear coupled with the rotation shaft, a plurality of third planetary gears meshed with the third sun gear, and a third ring gear meshed with the plurality of third planetary gears, the third ring gear may be an internal gear having the same diameter as the first and second ring gears, and the third sun gear and the third planetary gear may be a spur gear having a diameter different from that of the first sun gear, the second sun gear, and the first planetary gear.

The third gear set may further include a third carrier with which the plurality of third planetary gears each are rotatably coupled, and the third carrier may be fixed to the outside of the barrel.

The plurality of connection members may include first and second connection members coupled with the barrel, and the first and second connection members may move in a first direction toward the rotation shaft to be coupled with the first and second ring gears and move in a second direction opposite to the first direction to be separated from the first and second ring gears.

The first and second connection members may each include coupling grooves corresponding to shapes of outer circumferential portions of the first and second ring gears.

The first and second connection members may have an arch shape having the same curvature as that of the outer circumferential portions of the first and second ring gears.

The barrel may have a cylindrical shape and include a plurality of slots formed on an outer circumferential surface thereof, and the plurality of slots may each be movably inserted with the first and second connection members in the first direction and the second direction.

The first connection member may be configured in plural to be disposed along the outer circumferential surface of the barrel at the same interval, and the second connection member may be configured in plural to be disposed along the outer circumferential surface of the barrel at the same interval.

The first and second gear sets may be made of a metal material, and the first and second connection members may be made of a urethane material and fitted in the outer circumferential portions of the first and second ring gears, respectively.

The converter may further include a driver applying a force to the first and second connection members so that the first and second connection members move in different directions.

The driver may include: first and second magnets coupled with the first and second connection members, respectively; and first and second electromagnets applying a magnetic force to the first and second magnets.

The driver may include: first and second pressing members moving in the first direction to press the first and second connection members; first and second magnets coupled with the first and second pressing members; and first and second electromagnets applying a magnetic force to the first and second magnets.

The driver may include first and second elastic members applying a force to the first and second pressing members so that the first and second pressing members moving in the first direction return to the second direction.

The driver may further include a first seesaw member whose both ends are pivotably connected to the first and second connection members, and the seesaw member may apply a force to the other of the first and second connection members in a direction opposite to a direction of a force applied to any one of the first and second connection members.

The plurality of gear sets may further include a third gear set that includes a third sun gear coupled with the rotation shaft, a plurality of third planetary gears meshed with the third sun gear, and a third ring gear meshed with the plurality of third planetary gears, the plurality of connection members may further include a third connection member that moves in the first direction while being coupled with the barrel to be coupled with the third ring gear and moves in the second direction to be separated from the third ring gear, and the driver may further include a second seesaw member whose both ends are pivotably connected to the second and third connection members.

The converter may include: a first sensor measuring the rotation speed of the rotation shaft; and a controller controlling the driver to rotate the rotation shaft at a constant rotation speed depending on the rotation speed measured by the first sensor.

The converter may further include a second sensor measuring an output voltage of the electrostatic generator, and the controller may control the driver depending on an output voltage measured by the second sensor.

The generator may further include: a case; a rack gear disposed within the case; a swing member movably supporting the rack gear; and a pinion gear coupled with the barrel to be meshed with the rack gear.

The generator may further include: a driving shaft coupled with the barrel; and an impeller connected to the driving shaft.

The electrostatic generator may include: a first charging plate rotated while being coupled with the rotation shaft and including a plurality of first charged bodies disposed on one surface thereof; and a second charging plate whose one surface is provided with a plurality of second charged bodies disposed to contact or be adjacent to the plurality of first charged bodies.

According to another aspect of the present disclosure, a mobile device includes: a main body including a battery; and a generator disposed within the main body to apply electric power to the battery, in which the generator may include: a barrel rotated by being applied with a driving force from the main body shaken by an external force; a converter applied with a torque of the barrel to rotate a rotating shaft at a constant rotation speed; and an electrostatic generator driven by being applied with the torque from the rotation shaft.

According to the exemplary embodiments of the present invention, even though the generator is applied with the non-uniform driving power from the outside, the generator may use the converter to provide the uniform driving power to the electrostatic generator, thereby stably producing the required electric power.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
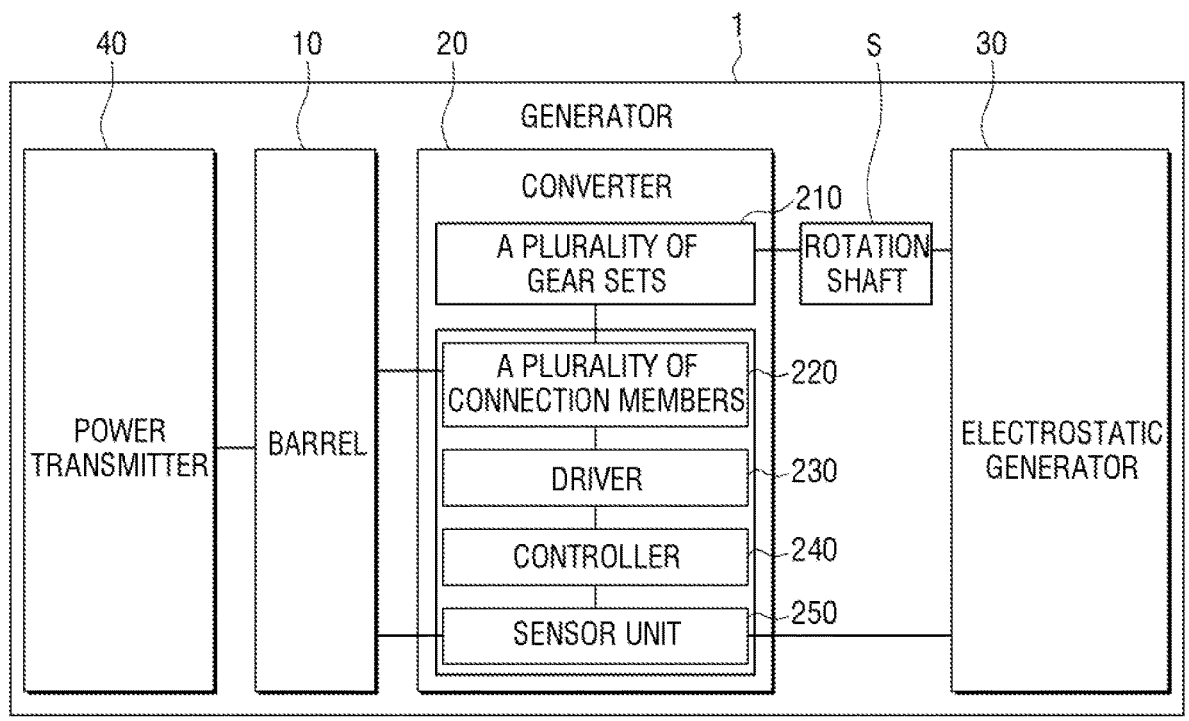
FIG. 1 is a block diagram schematically illustrating a configuration of a generator according to an exemplary embodiment of the present disclosure.

Hereinafter, exemplary embodiments of the present disclosure will be described in detail with reference to the accompanying drawings. The following exemplary embodiments will be described based on exemplary embodiments most appropriate to understand technical features of the present disclosure and the technical features of the present disclosure are not limited to the exemplary embodiments to be described below but it is illustrated that the present disclosure may be implemented like exemplary embodiments to be described.

Therefore, the present disclosure may be variously changed within the technical scope of the present disclosure in accordance with the exemplary embodiments to be described below and the changed exemplary embodiments may be considered to be included in the technical scope of the present disclosure. Further, to help understand the following exemplary embodiments, in signs described in the accompanying drawing, relevant components among components performing the same operations in each exemplary embodiment are denoted by reference numerals on the same or extending line.

Further, terms used for describing exemplary embodiments, 'first', 'second', etc. can be used to describe various components, but the components are not to be construed as being limited to the terms. These terms may be used to differentiate one component from other components. For example, the 'first' component may be named the 'second' component and the 'second' component may also be similarly named the 'first' component, without departing from the scope of the present disclosure.

Further, a generator according various exemplary embodiments of the present disclosure described with reference to the accompanying drawings is not limited in its size and sizes or thicknesses of each component configuring the generator may be exaggerated for clarity of description.

FIG. 1 is a block diagram schematically illustrating a configuration of a generator 1 according to an exemplary embodiment of the present disclosure.

Referring to FIG. 1, the generator 1 according to the exemplary embodiment of the present disclosure includes a barrel 10 rotating by being applied with driving power from the outside, a converter 20 applied with a torque of the barrel 10 to rotate a rotation shaft S at a predetermined rotation speed, and an electrostatic generator 30 driven by being applied with a torque from the rotation shaft S.

The barrel 10 may be rotated by being applied with vibration generated from a motion of the generator 1 by external power or driving power from driving sources such as wind power and water power outside the generator 1. However, when the barrel 10 is non-uniformly applied with the driving power from the outside, the barrel 10 is also rotated at a non-uniform speed.

Further, the generator 1 may further include a power transmitter 40 that transmits the external driving power to the barrel 10 to rotate the barrel 10.

The converter 20 may be applied with a torque from the rotating barrel 10 to rotate the rotation shaft S connected to the electrostatic generator 30 at a predetermined speed. That is, when the rotation speed of the barrel 10 is uniform and non-uniform, the converter 20 may rotate the rotation shaft S at the predetermined rotation speed to transmit uniform driving power to the electrostatic generator 30. Therefore, the electrostatic generator 30 may stably produce required electric power.

In detail, the converter 20 includes a plurality of gear sets 210, a plurality of connection members 220, a driver 230, a controller 240, and a sensor unit 250.

The plurality of connection members 220 are movably coupled with each other on the barrel 10 and may selectively connect any one of the plurality of gear sets 210 to the barrel 10. That is, only any one of the plurality of connection members 220 is coupled with the gear set corresponding thereto, and thus the torque of the barrel 10 may be transmitted to the rotation shaft S only through any one of the plurality of gear sets 210.

For this purpose, to rotate the rotation shaft S at a predetermined speed even though the barrel 10 is rotated at a non-uniform speed, the driver 230 moves any one of the plurality of connection members 220 to be selectively coupled with any one of the plurality of gear sets 210.

Further, the controller 240 may control the driver 230.

Further, the converter 20 may use the sensor unit 250 to measure the rotating speed of the barrel 10 or the rotation shaft S or electric energy generated from the electrostatic generator 30. The controller 240 may more precisely control the driver 230 to rotate the rotation shaft S at the predetermined speed on the basis of the measurement value transmitted from the sensor unit 250.

The detailed configuration and structure of the generator 1 will be described below.

Figure 2:
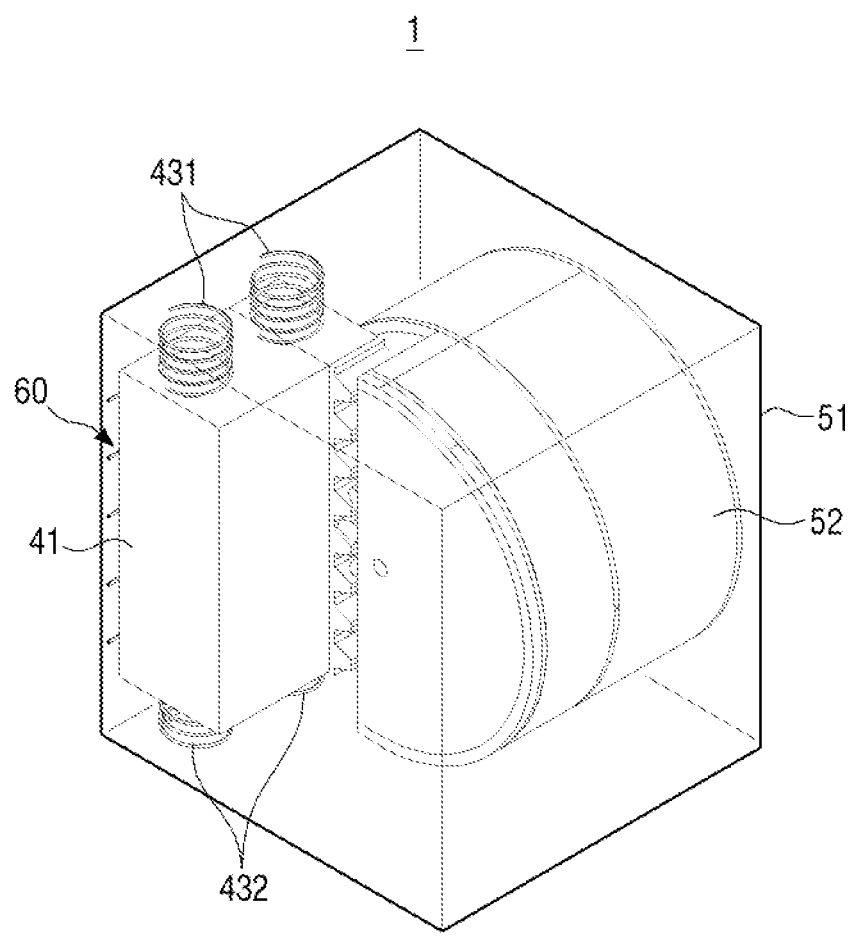
FIG. 2 is a perspective view illustrating the generator according to the exemplary embodiment of the present disclosure.
Figure 3:
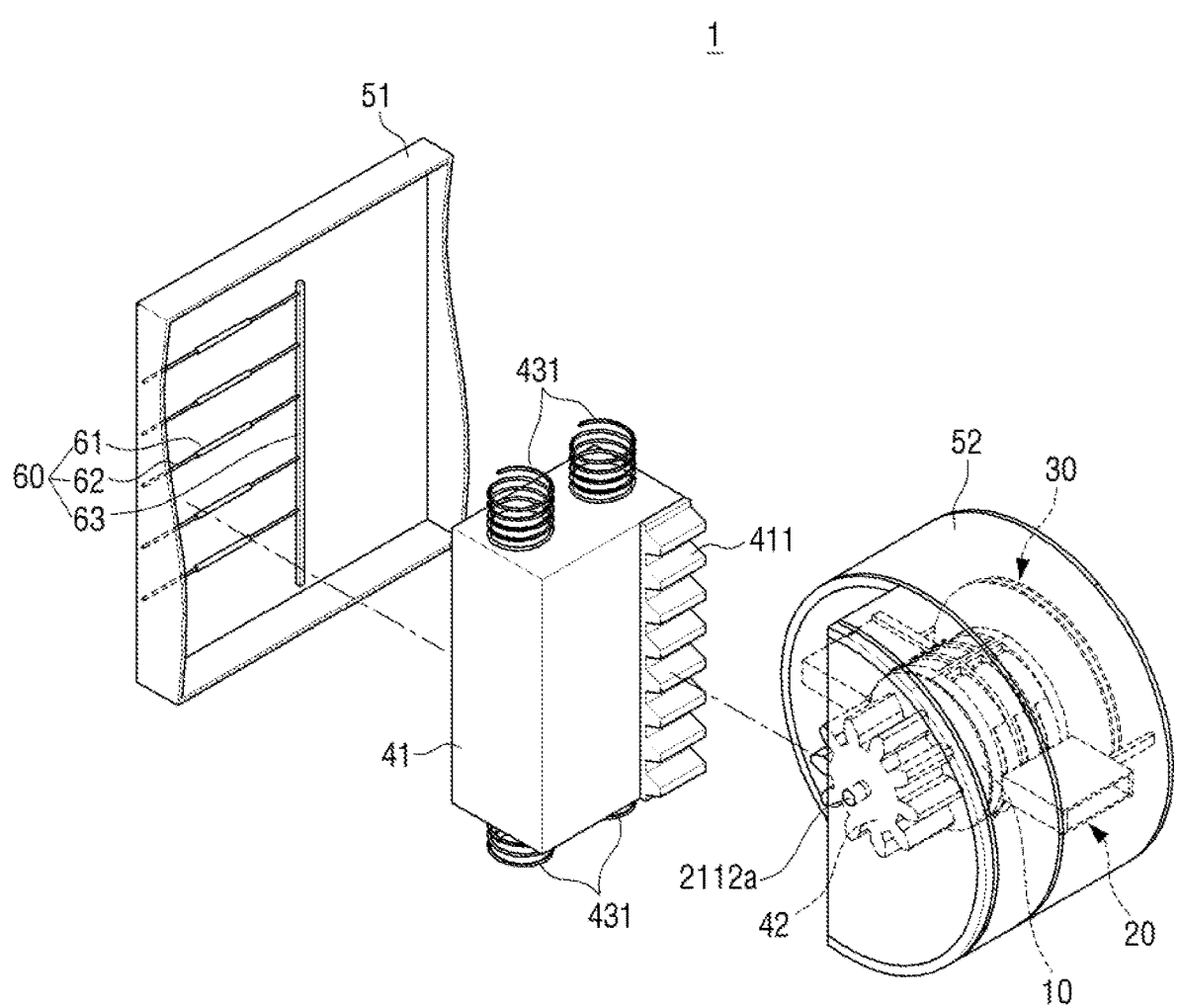
FIG. 3 is an exploded perspective view of the generator illustrated in FIG. 2.

FIG. 2 is a perspective view of the generator 1 according to the exemplary embodiment of the present disclosure and FIG. 3 is an exploded perspective view of the generator 1 illustrated in FIG. 2.

Referring to FIGS. 2 and 3, the generator 1 may include a first case 51 forming an appearance, a second case 52 disposed within the first case 51, the barrel 10 disposed in the second case 52, the converter 20, the electrostatic generator 30, and the power transmitter 40. The generator 1 may omit the second case 52 that encloses the barrel 10, the converter 20, and the electrostatic generator 30. In this case, the barrel 10, the converter 20, and the electrostatic generator 30 may be configured to be directly disposed within the first case 51.

The power transmitter 40 is disposed within the first case 51 and transmits driving power, which is transmitted from the outside, to the barrel 10.

The power transmitter 40 is configured to include a rack gear 41 and a pinion gear 42 meshed with the rack gear 41.

The rack gear 41 includes a plurality of teeth 411 disposed along a longitudinal direction and the rack gear 41 is coupled with a swing member 431 that movably supports the rack gear 41.

As illustrated in FIGS. 2 and 3, the swing member 431 may be a compression spring having an elastic force and may be configured in plural to be coupled with both ends of the rack gear 411.

In detail, the swing member 431 has one end coupled with an inner wall of the first case 51 and the other end coupled with the rack gear 41 to be able to connect between the rack gear 41 and the first case 51.

Therefore, the rack gear 41 may be connected to the first case 51 through the movable swing member 431 by the motion of the generator 1, such that the rack gear 41 may be movably disposed along a longitudinal direction within the first case 51.

Therefore, when the generator 1 is shaken or vibrated by an external force, the rack gear 41 connected to the swing member 431 may reciprocate along a longitudinal direction.

Further, the generator 1 may include a roller part 60 that is disposed between one side of the rack gear 41 and the first case 51 to guide a reciprocation of the rack gear 41.

The roller part 60 may be coupled with the inner wall of the first case 51 and may include a plurality of rollers 61 disposed along a longitudinal direction of the rack gear 41 and a plurality of roller shaft 62 with which the plurality of rollers 61 are coupled, in which the plurality of roller shafts 62 may be coupled with a roller support member 63 to be supported on the inner wall of the first case 51.

The rack gear 41 reciprocates along a longitudinal direction by the swing member 431, and therefore it is preferable that the plurality of roller shafts 62 is vertically disposed to the longitudinal direction of the rack gear 41.

The plurality of rollers 61 may support one side surface of the rack gear 41 and rotate along the reciprocation of the rack gear 41, thereby guiding the reciprocation of the rack gear 41.

Therefore, the rack gear 41 may reciprocate along the longitudinal direction even though the generator 1 is shaken in an irregular direction by the external force, such that the pinion gear 42 meshed with the rack gear 41 may be stably rotated.

The pinion gear 42 rotated by being meshed with the rack gear 41 reciprocating along the longitudinal direction may be coupled with one side of the barrel 10 to rotate the barrel 10 and the electrostatic generator 30 may be driven by the torque of the barrel 10 to produce electric power.

The detailed components of the barrel 10, the converter 20, and the electrostatic generator 30 will be described below.

Figure 4:
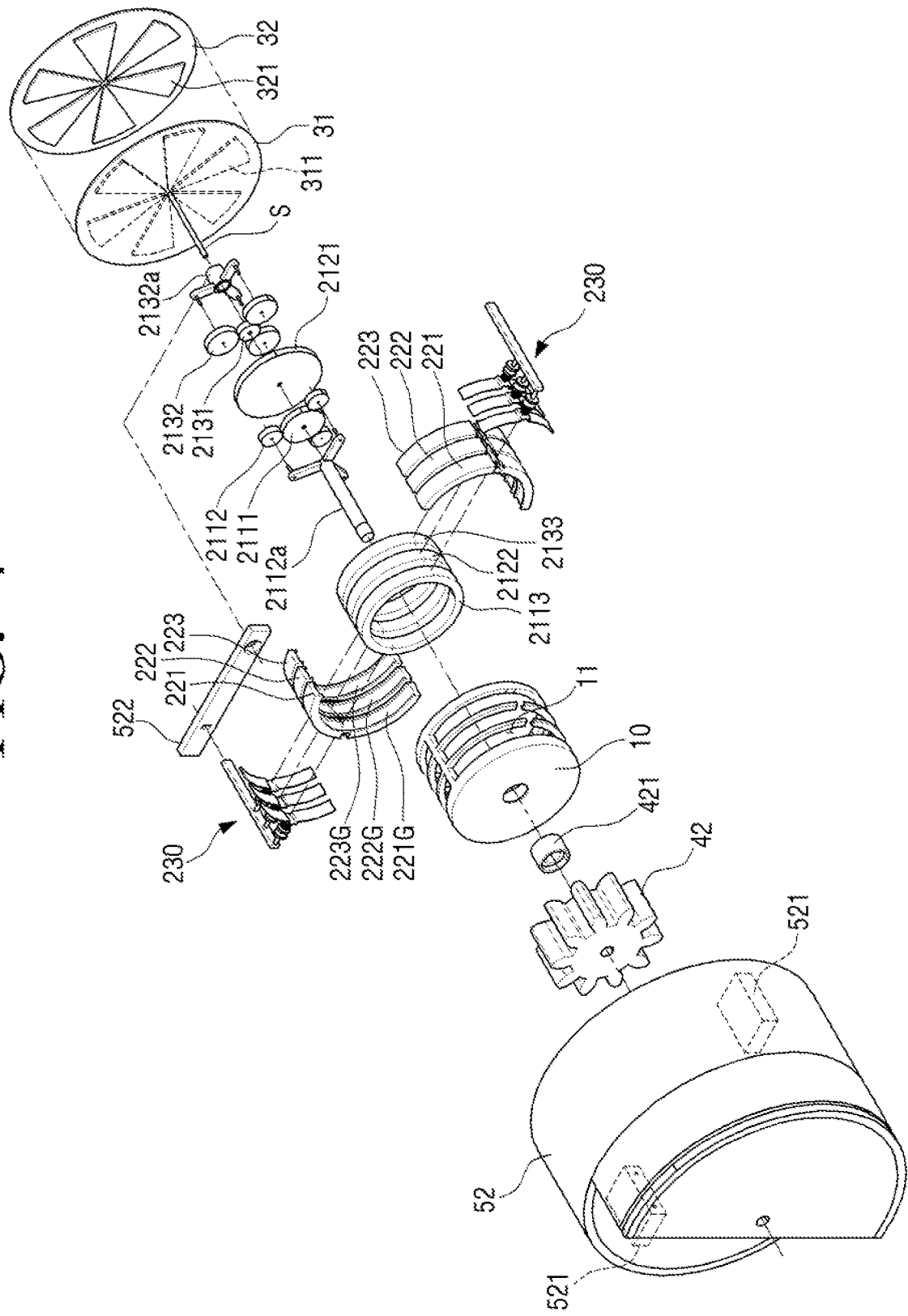
FIG. 4 is an exploded perspective view of detailed components of a barrel, a converter, and an electrostatic generator of a generator illustrated in FIG. 3.
Figure 5:
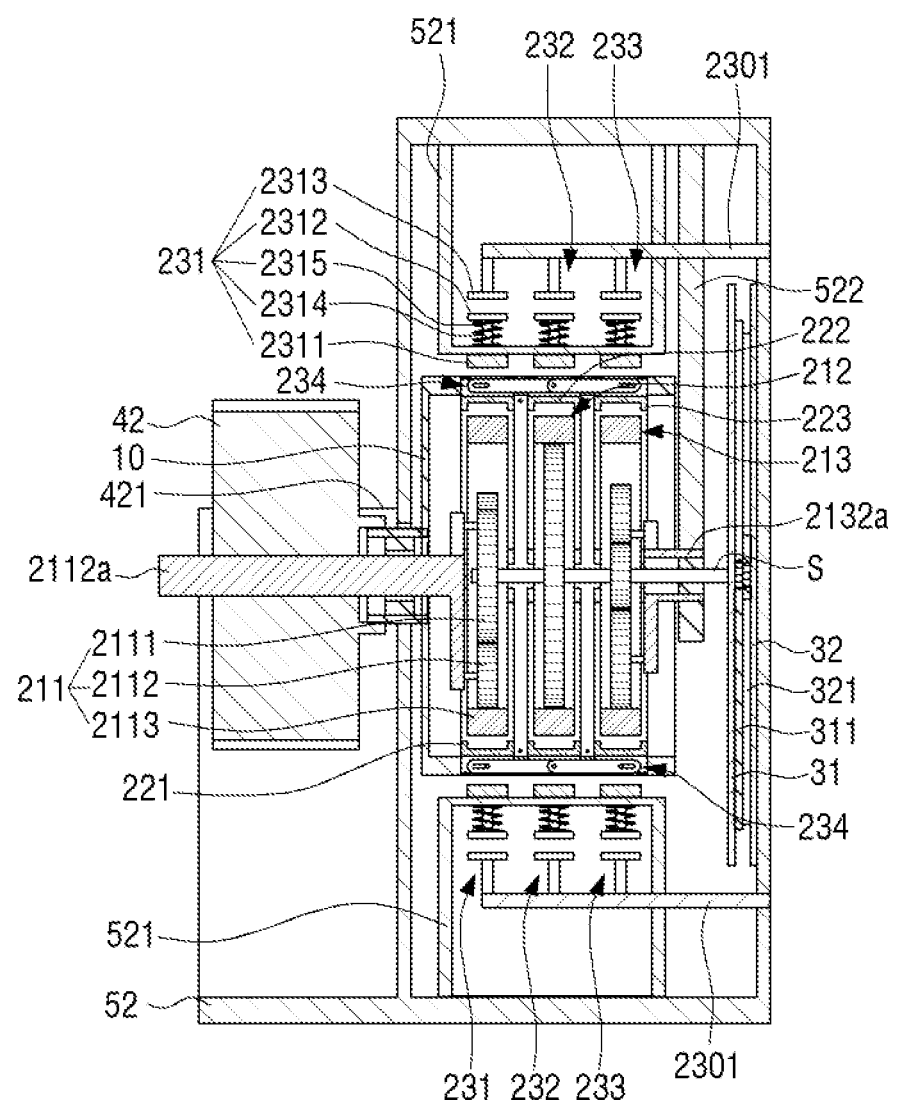
FIG. 5 is a cross-sectional view of the barrel, the converter, and the electrostatic generator of the generator illustrated in FIG. 3.

FIG. 4 is an exploded perspective view of the detailed components of the barrel 10, the converter 20, and the electrostatic generator 30 of the generator 1 illustrated in FIG. 3 and FIG. 5 is a cross-sectional view of the barrel 10, the converter 20, and the electrostatic generator 30 of the generator 1 illustrated in FIG. 4.

Hereinafter, the detailed structure of the barrel 10, the converter 20, and the electrostatic generator 30 of the generator 1 will be described with reference to FIGS. 4 and 5.

As described above, the barrel 10, the converter 20, and the electrostatic generator 30 are disposed within the second case 52.

The second case 52 may have approximately a cylindrical shape and the pinion gear 42 coupled with the barrel 10 to apply the torque to the barrel 10 may partially protrude from an opening formed at one side of the second case 52 to be meshed with the rack gear 41.

Further, the pinion gear 42 and the barrel 10 are connected to each other by a coupler 421, such that the pinion gear 42 and the rack gear 41 may be meshed with each other without interfering with the barrel 10.

The barrel 10 may have a cylindrical shape to be easily rotated and may be meshed with the pinion gear 42 by the coupler 421 coupled with any one of a top surface and a bottom surface having a circular shape. Hereinafter, for convenience of explanation, in the barrel 10, a surface with which the coupler 421 is coupled is called the top surface, a surface opposite to the top surface is called the bottom surface, and a surface connecting between the top surface and the bottom surface is called a side surface.

The side surface of the barrel 10 may be provided with slots 11 into which the plurality of connection members 220 described below are movably inserted. The slot 11 will be described below.

As described above, the converter 20 includes the plurality of gear sets 210, the plurality of connection members 220, the driver 230, the controller 240, and the sensor unit 250.

The plurality of gear sets 210 are connected to the rotation shaft S and includes first to third gear sets 211 to 213 having different gear ratios.

As illustrated in FIGS. 4 and 5, the first to third gear sets 211 to 213 are coupled with the rotation shaft S in parallel within the barrel 10.

As a result, any one of the first to third gear sets 211 to 213 having different gear ratios are selectively coupled with the barrel 10 even though the barrel 10 is rotated at an irregular rotation speed, such that the rotation speed of the rotation shaft S may be maintained to be constant.

For example, the first gear set 211 may have a gear ratio that may rotate the rotation shaft S at a speed slower than the rotation speed of the barrel 10, the second gear set 212 may have a gear ratio that may rotate the rotation shaft S at the same speed as the rotation speed of the barrel 10, and the third gear set 213 may have a gear ratio that may rotate the rotation shaft S at a speed faster than the rotation speed of the barrel 10.

Therefore, if the rotation shaft S is rotated at a speed faster than a preset reference range, the first gear set 211 may be connected to the barrel 10 to decelerate the rotation speed of the rotation shaft S and if the rotation shaft S is rotate at a speed within the preset reference range, the second gear set 212 may be connected to the barrel 10, and if the rotation shaft S is rotated at a speed slower than the preset reference range, the third gear set 213 may be connected to the barrel 10 to accelerate the rotation speed of the rotation shaft S.

In detail, the first gear set 211 includes a first sun gear 2111 coupled with the rotation shaft S, a plurality of first planetary gears 2112 meshed with the first sun gear 2111, and a first ring gear 2113 meshed with the plurality of first planetary gears 2112.

Further, the second gear set 212 includes a second sun gear 2121 coupled with the rotation shaft S and a second ring gear 2122 meshed with the second sun gear 2121.

Further, the third gear set 213 includes a third sun gear 2131 coupled with the rotation shaft S, a plurality of third planetary gears 2132 meshed with the third sun gear 2131, and a third ring gear 2133 meshed with the plurality of third planetary gears 2132.

As illustrated in FIG. 4, the first to third ring gears 2113, 2122, and 2133 may be an internal gear having the same diameter and the first sun gear 2111, the first planetary gear 2112, the second sun gear 2121, the third sun gear 2131, and the third planetary gear 2132 may be configured of a spur gear having different diameters.

The plurality of first planetary gears 2112 configuring the first gear set 211 are rotatably fixed to a first carrier 2112a that is fixed to an outside of the barrel 10.

For example, the plurality of first planetary gear 2112 are rotatably coupled with one end of the first carrier 2112a with respect to each rotation center and the other end opposite to one end of the first carrier 2112a may be fixed to the second case 52 by sequentially penetrating through the barrel 10, the coupler 421, and the pinion gear 42.

As illustrated in FIG. 4, the pinion gear 42, the coupler 421, and the barrel 10 each include a hollow through which the other end portion of the first carrier 2112a penetrates so that the first carrier 2112a may be fixed to the second case 52 without interfering with the rotation of the pinion gear 42, the coupler 421, and the barrel 10.

As a result, if the first ring gear 2113 is rotated, the plurality of first planetary gears 2112 may be rotated with respect to each rotation center. That is, the plurality of first planetary gears 2112 are fixed to the first carrier 2112a, and thus may not be revolved along an inner circumferential surface of the first ring gear 2113 but may be rotated at a fixed position, such that the first sun gear 2111 may be rotated depending on the gear ratio of the first gear set 211.

Further, the plurality of first planetary gears 2112 may consist of three gears disposed at the same interval and a diameter of the first planetary gear 2112 may be configured to be smaller than that of the first sun gear 2111.

Therefore, if the first ring gear 2113 is rotated, the plurality of first planetary gears 2112 are rotated and the first sun gear 2111 meshed with the first planetary gear 2112 is rotated at a speed slower than the rotation speed of the barrel 10. Therefore, the rotation shaft S is also rotated at a speed slower than that of the barrel 10, such that the rotation speed of the rotation shaft S may be decelerated.

An inner side of the second ring gear 2122 configuring the second gear set 212 is meshed with the second sun gear 2121. For example, as illustrated in FIGS. 4 and 5, an inner side of the second ring gear 2122 may be inserted with the second sun gear 2121, such that the second sun gear 2121 may be rotated at the same speed as the second ring gear 2122.

As a result, the second gear set 212 may be configured at a gear ratio that may rotate the rotation shaft S at the same speed as the rotating speed of the barrel 10.

Further, the second sun gear 2121 and the second ring gear 2122 configuring the second gear set 212 may be a disk integrally formed without a separate mesh structure.

The plurality of third planetary gears 2132 configuring the third gear set 213 are rotatably fixed to a third carrier 2132*a* that is fixed to the outside of the barrel 10.

For example, the plurality of third planetary gears 2132 are rotatably coupled with one end of the third carrier 2132*a* with respect to each rotation center and the other end opposite to the one end thereof is fixed to the second case 52.

In detail, as illustrated in FIG. 4, the third carrier 2132*a* may be coupled with a carrier support member 522 that is extended toward the rotation shaft S while being coupled with a side surface of the second case 52.

As a result, if the third ring gear 2133 is rotated, the plurality of third planetary gears 2132 may be rotated with respect to each rotation center. That is, the plurality of third planetary gears 2132 are fixed to the third carrier 2132*a*, and thus may not be revolved along an inner circumferential surface of the third ring gear 2133 but may be rotated at a fixed position, such that the third sun gear 2131 may be rotated depending on the gear ratio of the third gear set 213.

Further, the plurality of third planetary gears 2132 may consist of three gears disposed at the same interval and a diameter of the third planetary gear 2112 may be configured to be larger than that of the third sun gear 2131.

Therefore, if the third ring gear 2133 is rotated, the plurality of third planetary gears 2132 are rotated and the third sun gear 2131 meshed with the third planetary gear 2132 is rotated at a speed faster than the rotation speed of the barrel 10. Therefore, the rotation shaft S is also rotated at a speed faster than that of the barrel 10, such that the rotation speed of the rotation shaft S may be accelerated.

Hereinabove, the case in which the plurality of gear sets 210 consist of the first to third gear sets 211 to 213 that decelerate, maintain, and accelerate the rotation speed of the rotation shaft S corresponding to the rotation speed of the barrel 10 is described by way of example but the present disclosure is not limited thereto, and therefore the number of gear sets may be increased and decreased. Meanwhile, when the number of gear sets is increased, the rotation speed of the rotation shaft S may be controlled more precisely. As such, the plurality of gear sets may be changed to have various structures that may change the rotation speed of the rotation shaft S.

The plurality of connection member 200 may be configured in plural and includes first to third connection members 221, 222, and 223 that are coupled with the barrel 10.

The first to third connection members 221, 222, and 223 that are coupled with the barrel 10 may be rotated together depending on the rotation of the barrel 10 and may be selectively coupled with the first to third ring gears 2113, 2122, and 2133 to selectively transmit the torque of the barrel 10 to the first to third ring gears 2113, 2122, and 2133.

The first to third connection members 221, 222, and 223 are disposed at positions facing the first to third ring gears 2113, 2122, and 2133. For example, the first to third connection members 221, 222, and 223 may be disposed on the barrel 10 to face each outer circumferential surface of the third to third ring gears 2113, 2122, and 2133.

The first to third connection members 221, 222, and 223 may move in a first direction toward the rotation shaft S to be coupled with the first to third ring gears 2113, 2122, and 2133 and moves in a second direction opposite to the first direction to be separated from the third to third ring gears 2113, 2122, and 2133.

The first to third connection members 221, 222, and 223 may have an arch shape that has the same curvature as that of outer circumferential surfaces of the first to third connection members 221, 222, and 223.

Further, an outer circumferential surface of the barrel 10 may be formed with the plurality of slots 11 corresponding to the shapes of the first to third connection members 221, 222, and 223 and the first to third connection members 221, 222, and 223 may be movably inserted into the plurality of slots 11. As a result, the first to third connection members 221, 222, and 223 may move in the first direction and the second direction on the plurality of slots 11.

Further, the plurality of slots 11 may be formed with guide grooves (not illustrated) that guide the movement of the first to third connection members 221, 222, and 223 in the first direction and the second direction, each outer surface of the first to third connection members 221, 222, and 223 is formed with guide protrusions (not illustrated) that are slidably inserted into the guide grooves, such that the movement of the first to third connection members 221, 222, and 223 in the first direction and the second direction may be accurately guided.

Further, to prevent the first to third connection members 221, 222, and 223 from being separated from the barrel 10 due to the movement of the first to third connection members 221, 222, and 223 in the first direction and the second direction, a thickness of the side surface of the barrel 10 is preferably configured to be larger than a movement section of the first to third connection members 221, 222, and 223.

Further, as illustrated in FIG. 4, the first to third connection members 221, 222, and 223 are each configured in plural, and thus may be disposed at the same interval along the outer circumferential surface of the barrel 10.

In detail, the first to third connection members 221, 222, and 223 may each consist of a pair of connection members and are coupled with the ring gears in the state in which the pair of connection members are disposed to be symmetrical to each other with respect to the ring gear, such that the barrel 10 and the first to third ring gears 2113, 2122, and 2133 may be more firmly coupled with each other.

Further, the first to third connection members 221, 222, and 223 may each include first to third coupling grooves 221G, 222G, and 223G corresponding to shapes of outer circumferential portions of the first to third ring gears 2113, 2122, and 2133.

As a result, the first to third ring gears 2113, 2122, and 2133 may be inserted into the first to third coupling grooves 221G, 222G, and 223G, respectively.

Further, the first to third connection members 221, 222, and 223 each are preferably configured to be higher than heights of the first to third ring gears 2113, 2122, and 2133 so that the first to third ring gears 2113, 2122, and 2133 may be inserted into the first to third coupling grooves 221G, 222G, and 223G.

Further, the first to third gear sets 211 to 213 may be made of a metal material and the first to third connection members 221, 222, and 223 may be made of a urethane material having a large friction force with metal, such that if the first to third connection members 211 to 223 move in the first direction, each outer circumferential portion of the first to third ring gears 2113, 2122, and 2133 may be firmly fitted in the first to third coupling grooves 221G, 222G, and 223G.

As a result, the third to third connection members 211 to 223 may each selectively move in the first direction and the second direction even during the rotation of the barrel 10 to be firmly coupled with the first to third ring gears 2113, 2122, and 2133, such that the torque of the barrel 10 may be selectively transmitted to the first to third gear sets 211 to 213 without being lost.

The driver 230 may apply a force to the first to the third connection members 221, 222, and 223 so that the first to third connection members may move in the first direction to be coupled with the first to third ring gears 2113, 2122, and 2133 and may move in the second direction to be separated from the first to third ring gears 2113, 2122, and 2133.

As illustrated in FIG. 4, when the first to third connection members 221, 222, and 223 are configured in plural to be symmetrically disposed to each other on the barrel 10, the driver 230 may be also configured in plural to apply a force to the first to third connection members 221, 222, and 223 disposed at one side of the side surface of the barrel 10 and the first to third connection members 221, 222, and 223 disposed at the other side of the side surface of the barrel 10, respectively.

The configuration and structure of the driver 230 will be described below in detail.

The electrostatic generator 30 may generate a voltage by direct friction charging or a voltage by electrostatic induction between charged bodies spaced apart from each other and may be, for example, a direct charging type or indirect charging type triboelectric nanogenerator.

In detail, the electrostatic generator 30 includes a first charging plate 31 that is rotated while coupled with the rotation shaft S and includes a plurality of first charged bodies 311 disposed on one surface thereof and a second charging plate 32 including a plurality of second charged bodies 321 disposed on one surface thereof, with the plurality of second charged bodies 321 being disposed to contact or be adjacent to the plurality of first charged bodies 311.

The first charging plate 31 may be coupled with the rotation shaft S to be rotated depending on the rotation of the rotation shaft S and may be a disk shape.

The plurality of first charged bodies 311 may be radially disposed on one surface of the first charging plate 31 and may be rotated depending on the rotation of the first charging plate 31.

The second charging plate 32 includes the plurality of second charged bodies disposed on one surface facing the first charging plate 31 and the other surface opposite to the one surface is fixed to the second case 52.

Therefore, the first charging plate 31 may be rotated by being connected to the rotation shaft S to rotate the plurality of first charged bodies 311, and thus the plurality of second charged bodies 321 disposed to face the plurality of first charged bodies 311 are charged, such that the electrostatic generator 30 may produce electric power.

The first charged body 311 and the second charged body 321 described above may produce electric power by the charging therebetween depending on the rotation. For this purpose, the first charged body 311 may be made of a metal material and the second charged body 321 may be made of polymers such as polydiemethylsiloxane (PDMS), polyamide (PA), polyurethane (PU), and polytetrafluoroethylene (PTFE).

Further, the first charged body 311 may be made of a metal material and metal oxides such as aluminum oxide, titanium oxide, and silicon oxide and the second charged body 321 may be made of superconducting materials such as poly vinylidene fluoride (PVDF), poly vinyl chloride (PVC), polyvinyl fluoride (PVF), tri glycerin sulphate (TGS), lead zirconate titanate (PZT), and lead stannic titanate (PST).

However, the materials constituting the first charged body 311 and the second charged body 321 described above may be substituted with each other. In addition to the above materials, the first charged body 311 and the second charged body 321 are charged by the rotation of the first charged body 311 and thus may be substituted with various materials capable of produce electric power.

Figure 6:
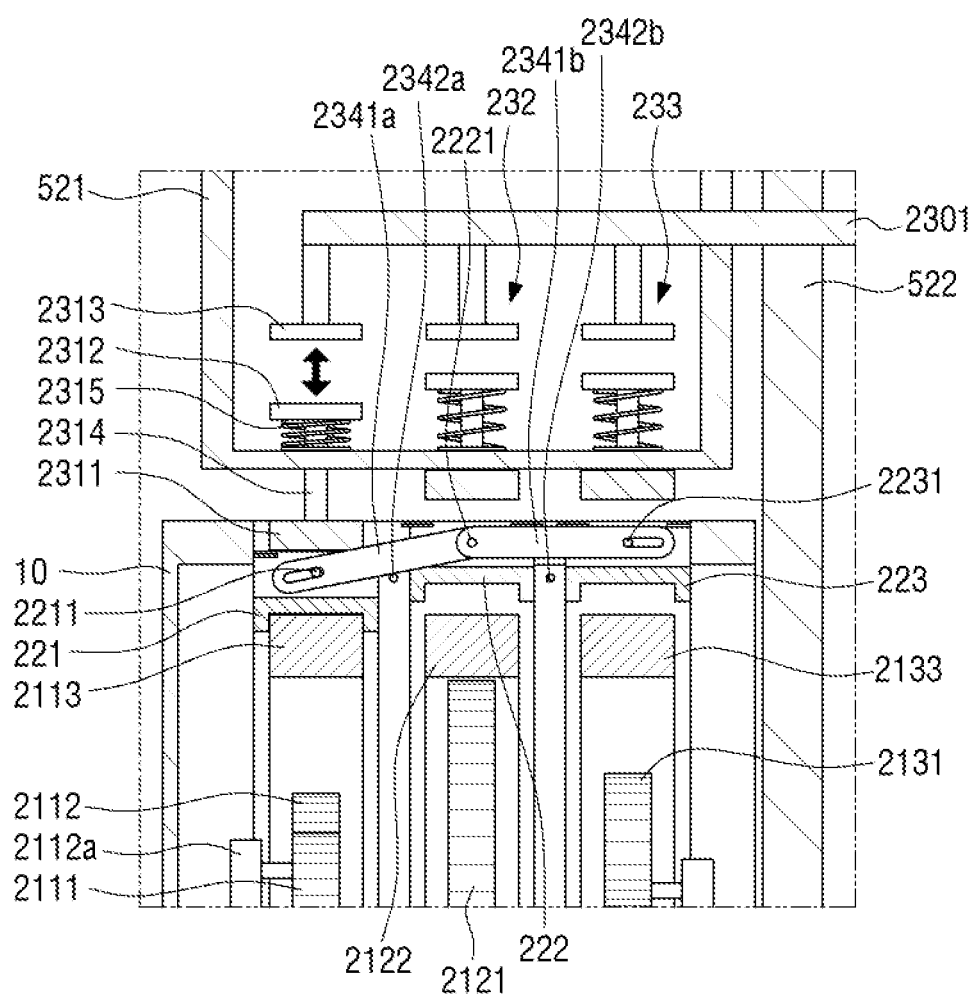
FIGS. 6 to 8 are an enlarged cross-sectional view illustrating an operation of the converter illustrated in FIG. 5.
Figure 7:
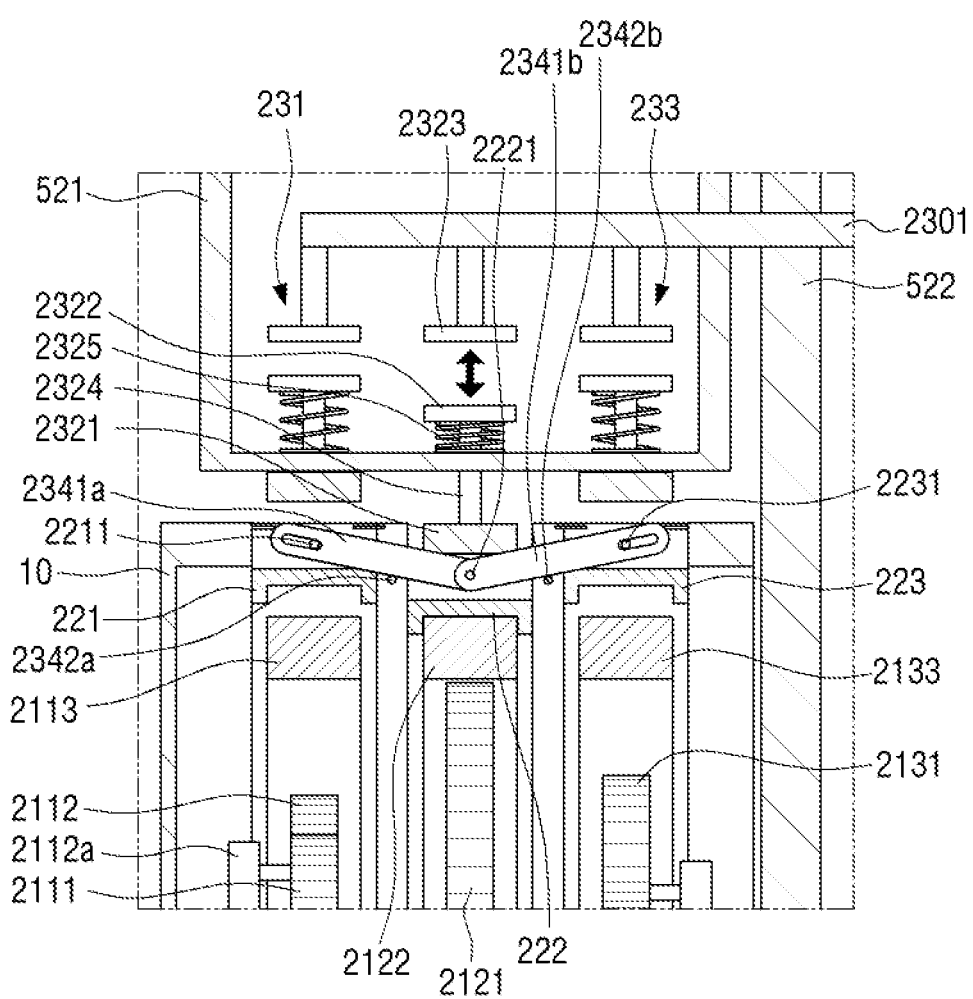
Figure 8:
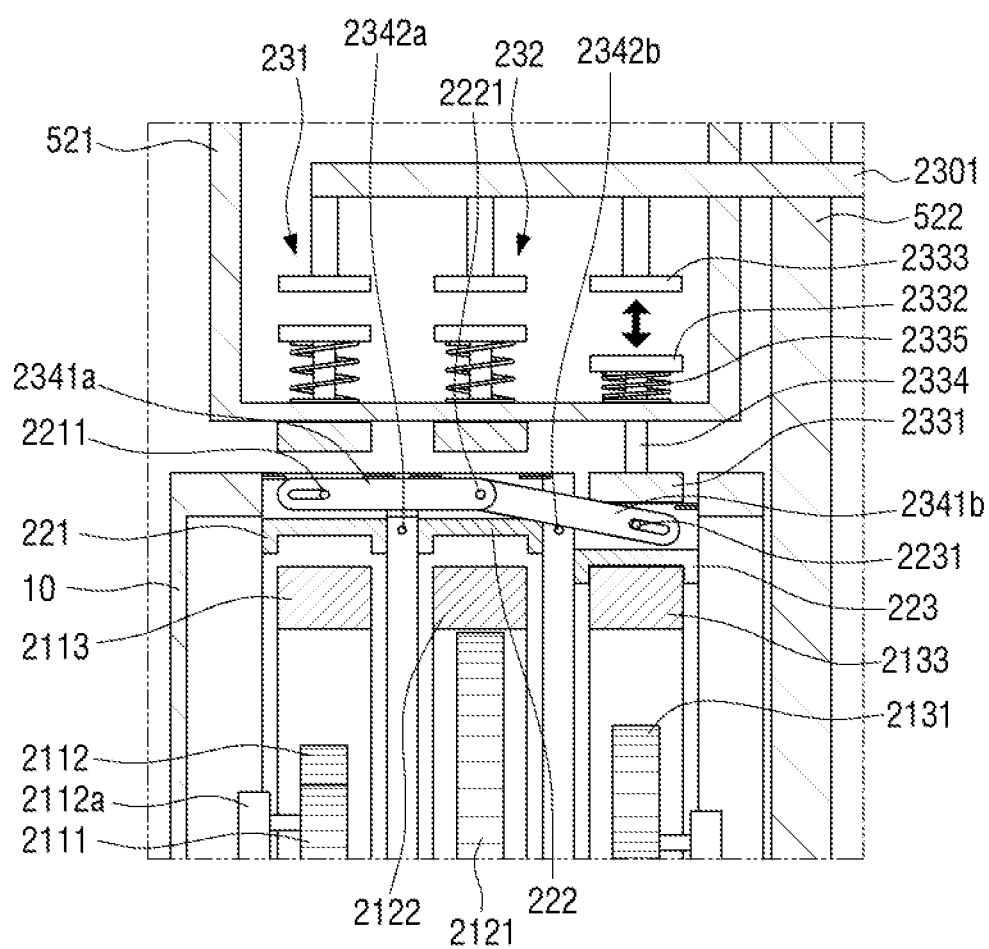

FIGS. 6 to 8 are an enlarged cross-sectional view illustrating an operation of the converter 20 illustrated in FIG. 5.

As described above, the driver 230 is configured in plural and thus may each be disposed at both sides of the side surface of the barrel 10 but the configuration and operation thereof are the same, and therefore for convenience of explanation, FIGS. 6 to 8 are an enlarged view of only a part of the converter 20.

Hereinafter, the structure of the converter 20 will be described in detail with respect to the driver 230 with reference to FIGS. 5 to 8.

The driver 230 includes a first driving unit 231 applying a force to the first connection member 221, a second driving unit 232 applying a force to the second connection member 222, and a third driving unit 233 applying a force to the third connection member 223.

The first to third driving units 231 to 232 may each be disposed to face the first to third connection members 221, 222, and 223, and first to third pressing members 2311, 2321, and 2331 of the first to third driving units 231 to 233 move in the first direction to press the first to third connection members 221, 222, and 223 to couple the first to third connection members 221, 222, and 223 with the first to third ring gears 2113, 2122, and 2133.

The first driving unit 231 includes a first pressing member 2311 disposed to face the outer circumferential surface of the first connection member 221, a first magnet 2312 coupled with the first pressing member 2311, a first electromagnet 2313 disposed to face the first magnet 2312 to be able to apply a magnetic force to the first magnet 2312, a first rod 2314 connecting between the first pressing member 2311 and the first magnet 2312, and a first elastic member 2315 disposed between the first pressing member 2311 and the first magnet 2312.

Further, the second driving unit 232 includes a second pressing member 2321 disposed to face the outer circumferential surface of the second connection member 222, a second magnet 2322, a second electromagnet 2323, a second rod 2324, and a second elastic member 2325 and the third driving unit 233 includes a third pressing member 2331 disposed to face the outer circumferential surface of the third connection member 223, a third magnet 2332, a third electromagnet 2333, a third rod 2334, and a third elastic member 2335.

The structure of the second and third driving units 232 and 233 is the same as the structure of the first driving unit 231, and therefore the structure of the first driving unit 231 will be described mainly and the description for the structure of the second and third driving units 232 and 233 overlapping with the structure of the first driving unit 231 will be omitted.

The first pressing member 2311 is disposed to face the first connection member 221 and disposed to be spaced apart from the first connection member 221 at a predetermined interval, such that the first pressing member 2311 may be disposed not to interfere with the rotating barrel 10 in the state in which the first driving unit 231 is not operated.

Further, the first pressing member 2311 may have a shape corresponding to the outer circumferential surface of the first connection member 221 to easily press the first connection member 221 and may have an arch shape having the same curvature as that of the outer circumferential surface of the first connection member 221.

The first pressing member 2311 may be coupled with the first magnet 2312 and the first pressing member 2311 and the first magnet 2312 may be connected to each other by the first rod 2314.

In detail, the first rod 2314 may have a cylindrical shape having a cross sectional area smaller than that of the first pressing member 2311 and the first magnet 2312 and one end thereof is connected to a central portion of the first pressing member 2311 and the other end thereof is connected to a central portion of the first magnet 2312.

Therefore, if the magnetic force is applied to the first magnet 2312 by the first electromagnet 2313, the first magnet 2312, the first rod 2314, and the first pressing member 2311 may move together.

Further, the first rod 2314 may be movably inserted into a driver case 521 that is disposed within the second case 52, and thus the first pressing member 2311, the first magnet 2312, and the first rod 2314 may be movably supported to the second case 52.

In detail, the first electromagnet 2313 and the first magnet 2312 are disposed within the driver case 521, the driver case 521 is provided with a first driving hole (not illustrated) formed toward the rotation shaft S, and the first rod 2314 may be movably inserted into the first driving hole.

Further, the first pressing member 2311 may be coupled with one end of the first rod 2314 at an outer side of the driver case 521, such that the movement of the first pressing member 2311 in the first direction and the second direction may be guided by the first rod 2314 moving along the first driving hole. For this purpose, it is preferable that a diameter of the first driving hole is equal to or greater than that of the first rod 2314 and is equal to or smaller than that of the first pressing member 2311.

Further, as the first pressing member 2311 moves in the first direction or the second direction, one surface of the first pressing member 2311 and one surface of the first magnet 2312 that face each other interfere with the driver case 521, and thus a moving distance of the first pressing member 2311 may be restricted.

The first electromagnet 2313 is coupled with an electromagnet support member 2301 fixed to the second case 52 and is disposed to face the first magnet 2312 within the driver case 521.

An electric wire (not illustrated) along which a current may be supplied to the first electromagnet 2313 may be disposed within the electromagnet support member 2301.

If a current is applied to the first electromagnet 2313, the first electromagnet 2313 may apply a magnetic force to the first magnet 2312 and may form a magnetic force to apply a repulsion or an attraction to the first magnet 2312 along a direction of current.

If the first electromagnet 2313 applies a repulsion to the first magnet 2312, the first magnet 2312 moves in the first direction, such that the first pressing member 2311 may press the first connection member 221.

As a result, the first connection member 221 and the first ring gear 2113 may be coupled with each other, and the torque of the barrel 10 is transmitted to the first gear set 211 through the first connection member 221 to rotate the rotation shaft S.

Further, the first elastic member 2315 applying a force to the first pressing member 2311 is disposed between the first pressing member 2311 and the first magnet 2312 so that the first pressing member 2311 moving in the first direction returns to the second direction.

As illustrated in FIGS. 5 to 8, the first elastic member 2315 may be a compression spring disposed to enclose the first rod 2314, and the first elastic member 2315 may be supported to the driver case 521 while being disposed between the first magnet 2312 and the driver case 521 to apply an elastic force to the first magnet 2312, which moves in the first direction, in the second direction.

As described above, if the magnetic field applying a repulsion to the first magnet 2312 is formed by applying a current to the first electromagnet 2313, the first magnet 2312 moves the first pressing member 2311 in the first direction, and thus the first connection member 221 and the first ring gear 2113 are coupled with each other.

For this purpose, it is preferable to apply a current to the first electromagnet 2315 so that the repulsion applied to the first magnet 2312 by the first electromagnet 2313 is larger than the elastic force applied in the second direction of the first elastic member 2315.

If the first connection member 221 and the first ring gear 2113 are coupled with each other, the current applied to the first electromagnet 2315 is interrupted, and thus the magnetic field applied to the first magnet 2312 is released and the first magnet 2312 and the first pressing member 2311 coupled therewith move in the second direction by the elastic force of the first elastic member 2315 to return.

As a result, by instantly applying a current to the first electromagnet 2313 and then interrupting the current, the first pressing member 2311 may return to the second direction immediately after moving in the first direction to press the first connection member 221 and may prevent the first pressing member 221 from interfering with the rotating barrel 10. As a result, electric energy used to operate the first electromagnet 2313 may also be minimized.

As described above, the configuration of the second driving unit 232 and the third driving unit 233 are the same as that of the first driving unit 231, and the second connection member 222 of the second driving unit 232 may be pressed by the second pressing member 2321 to be coupled with the second ring gear 2122 and the third connection member 223 of the third driving unit 233 may be pressed by the third pressing member 2331 to be coupled with the third ring gear 2133.

Further, when any one of the first to third connection members 221, 222, and 223 move in the first direction, the driver 230 includes a seesaw member 234 that moves the rest two connection members in the second direction.

The seesaw member 234 may include a first seesaw member 2341a pivotably connected to the first and second connection members 221 and 222 and a second seesaw member 2341b pivotably connected to the second and third connection members 222 and 223.

The first seesaw member 2341a may apply a force to the other of the first and second connection members 221 and 222 in a direction opposite to a direction of a force applied to any one of the first and second connection members 221 and 222 and the second seesaw member 2341b may apply a force to the other of the second and third connection members 222 and 223 in a direction opposite to a direction of a force applied to any one of the second and third connection members 221 and 222.

In detail, the first seesaw member 2341*a* may move the second connection member 222 in the second direction by a principle of lever if the first connection member 221 moves in the first direction by the repulsion of the first electromagnet 2313 and may move the first connection member 221 in the second direction if the second connection member 222 moves in the first direction by the repulsion of the second electromagnet 2323.

Further, the second seesaw member 2341*b* may move the third connection member 223 in the second direction by the principle of lever if the second connection member 222 moves in the first direction by the repulsion of the second electromagnet 2323 and may move the second connection member 222 in the second direction if the third connection member 223 moves in the first direction by the repulsion of the third electromagnet 2333.

As illustrated in FIGS. 5 to 8, a first seesaw shaft 2342*a* supporting a central lower portion of the first seesaw member 2341*a* may be disposed between the first connection member 221 and the second connection member 222.

One end of the first seesaw member 2341*a* may be pivotably connected to the first connection member 221, and for example, a protrusion 2211 formed at the first connection member 221 may be inserted into a long hole formed at one end of the first seesaw member 2341*a* and thus one end of the first seesaw member 2341*a* may be pivotably connected to the first connection member 221.

Further, the protrusion 2221 formed at the second connection member 222 may be inserted into a coupled hole formed at the other end of the first seesaw member 2341*a*, and thus the other end of the first seesaw member 2341*a* may be pivotably connected to the second connection member 222.

Therefore, when the first pressing member 2311 moves in the first direction and thus the first connection member 221 moves in the first direction, one end of the first seesaw member 2341*a* moves in the first direction and the other end of the first seesaw member 2341*a* moves in the second direction with respect to the first seesaw shaft 2342*a* and thus the second connection member 222 connected to the other end of the first seesaw member 2341*a* moves in the second direction.

By doing so, if the first magnet 2312 is applied with the repulsion by applying a current to the first electromagnet 2313, the first pressing member 2311 may move in the first direction to press the first connection member 221, such that the first connection member 221 and the first ring gear 2113 may be coupled with each other.

Further, the first connection member 221 moves in the first direction and at the same time the other end of the first seesaw member 2341*a* moves in the second direction, and thus the second connection member 222 moves in the second direction, such that the second connection member 222 and the second ring gear 2122 may be separated from each other.

Again, if the second magnet 2322 is applied with the repulsion by applying a current to the second electromagnet 2323, the second pressing member 2321 may move in the first direction to press the second connection member 222, such that the second connection member 222 and the second ring gear 2122 may be coupled with each other.

Further, the second connection member 222 moves in the first direction and at the same time one end of the first seesaw member 2341*a* moves in the second direction, and thus the first connection member 221 moves in the second direction, such that the first connection member 221 and the first ring gear 2113 may be separated from each other.

As such, when any one of the first and second connection members 221 and 222 moves in the first direction through the first seesaw member 2341*a*, the other of the first and second connection members 221 and 222 may move in the second direction simultaneously, and only any one of the first and second connection members 221 and 222 may be coupled with the first and second ring gears 2113 and 2122 to transmit the torque to the rotation shaft S.

Further, a second seesaw shaft 2342*b* supporting a central lower end portion of the second seesaw member 2341*b* may be disposed between the second connection member 222 and the third connection member 223.

One end of the second seesaw member 2341*b* may be pivotably connected to the third connection member 223, and for example, a protrusion 2213 formed at the third connection member 223 may be inserted into a long hole formed at one end of the second seesaw member 2341*b* and thus one end of the second seesaw member 2341*b* may be pivotably connected to the third connection member 223.

Further, the protrusion 2221 formed at the second connection member 222 may be inserted into a coupled hole formed at the other end of the second seesaw member 2341*b*, and thus the other end of the second seesaw member 2341*b* may be pivotably connected to the second connection member 222.

Therefore, when the third pressing member 2331 moves in the first direction and thus the third connection member 223 moves in the first direction, one end of the second seesaw member 2341*b* moves in the first direction and the other end of the second seesaw member 2341*b* moves in the second direction with respect to the second seesaw shaft 2342*b* and thus the second connection member 222 connected to the other end of the second seesaw member 2341*a* moves in the second direction.

By doing so, if the third magnet 2332 is applied with the repulsion by applying a current to the third electromagnet 2333, the third pressing member 2331 may move in the first direction to press the first connection member 223, such that the third connection member 223 and the third ring gear 2133 may be coupled with each other.

Further, the third connection member 223 moves in the first direction and at the same time the other end of the second seesaw member 2341*b* moves in the second direction, and thus the second connection member 222 moves in the second direction, such that the second connection member 222 and the second ring gear 2122 may be separated from each other.

Again, if the second magnet 2322 is applied with the repulsion by applying a current to the second electromagnet 2323, the second pressing member 2321 may move in the first direction to press the second connection member 222, such that the second connection member 222 and the second ring gear 2122 may be coupled with each other.

Further, the second connection member 222 moves in the first direction and at the same time one end of the second seesaw member 2341*b* moves in the second direction, and thus the third connection member 223 also moves in the second direction, such that the third connection member 223 and the third ring gear 2133 may be separated from each other. Further, as described above, the second connection member 222 moves in the first direction and at the same time one end of the first seesaw member 2341*a* also moves in the second direction, such that the first connection member 221 and the first ring gear 2113 may be separated from each other.

As such, any one of the second and third connection members 222 and 223 moves in the first direction through the second seesaw member 2341*b*, and thus the other of the second and third connection members 222 and 223 may move in the second direction simultaneously, such that only any one of the second and third connection members 222 and 223 may be coupled with the second and third ring gears 2122 and 2133 to transmit the torque to the rotation shaft S.

The coupling of the first to third connection members 211, 222, and 223 with the first to third ring gears 2113, 2122, and 2133 may be selectively switched only by the simple operation using the foregoing seesaw member 234.

Further, the foregoing driver 230 may be controlled by the controller 240.

In detail, the controller 240 may control any one of the first to third connection members 221, 222, and 223 to be connected to the first to third ring gears 2113, 2122, and 2133 by applying a current to any one of the first to third electromagnets 2313, 2323, and 2333 to form the magnetic field.

Further, the converter 30 may include the sensor unit 250 and the sensor unit 250 may include a plurality of sensors sensing the operation state of the generator 1.

The electrostatic generator 30 according to the exemplary embodiment of the present disclosure produces electric power by the rotation of the first charging plate 31 connected to the rotation shaft S, and therefore it is preferable to make the rotation speed of the rotation shaft S constant to continuously produce constant electric power that a user requires.

However, the barrel 10 rotated by being applied with the driving power from the outside may be rotated at an irregular speed, and therefore the driver 230 is controlled by the controller 240 and the sensor unit 250 to maintain the rotation speed of the rotation shaft S at a constant speed, thereby stably producing constant electric power through the electrostatic generator 30.

In detail, the sensor unit 250 may include a first sensor (not illustrated) measuring the rotation speed of the rotation shaft S.

The first sensor may measure the rotation speed of the rotation shaft S in real time and the controller 240 may control the driver 230 to rotate the rotation shaft S at a constant speed depending on the measured rotation speed of the rotation shaft S.

Further, the sensor unit 250 may further include the second sensor (not illustrated) measuring an output voltage of the electrostatic generator 30 and the controller 240 may control the driver 230 to control the rotation speed of the rotation shaft S depending on the output voltage measured by the second sensor.

Further, the sensor unit 250 may further include a third sensor measuring the rotation speed of the barrel 10 and may control the driver 230 to rotate the rotation shaft S at a constant speed depending on the measured rotation speed of the barrel 10.

The control of the driver 230 by the controller 240 and the sensor unit 250 will be described below in more detail.

Hereinafter, the control of the driver 230 and the operation of the driver 230 by the controller 240 and the sensor unit 250 will be described in detail with reference to FIGS. 6 to 8.

When the generator 1 is shaken at an irregular speed by the external force, the rack gear 41 also reciprocates at an irregular speed, and therefore the pinion gear 42 and the barrel 10 connected to the pinion gear 42 are also rotated at an irregular speed.

At this point, when the rotation speed of the rotation shaft S measured by the first sensor is rotated faster than the preset reference speed, as illustrated in FIG. 6, the controller 240 may apply a current to the first electromagnet 2313 to apply the repulsion to the first magnet 2312, such that the first connection member 221 and the first ring gear 2113 may be coupled with each other.

As described above, the first gear set 211 may decelerate the rotation speed of the rotation shaft S and thus the first connection member 221 and the first ring gear 2113 are coupled with each other, such that the rotation speed of the rotation shaft S may be decelerated within the preset reference speed.

By doing so, the rotation speed of the first charging plate 31 rotated by the rotation shaft S is also changed to the preset reference speed to control the produced electric energy to be within the preset range using the electrostatic generator 30. Further, when the first connection member 221 moves in the first direction, the second connection member 222 may move in the second direction to be separated from the second ring gear 2122.

Further, the output voltage of the electrostatic generator 30 may be measured by the second sensor.

When the output voltage of the electrostatic generator 30 measured by the second sensor is higher than the preset reference voltage, the controller 240 may couple between the first connection member 221 and the first ring gear 2113 to decelerate the rotation speed of the rotation shaft S, such that the voltage output from the electrostatic generator 30 may be lowered to be included in the preset range.

By doing so, the magnitude of the electric power generated from the electrostatic generator 30 may be maintained within the predetermined range that the user requires.

Further, when the rotation speed of the barrel 10 is measured by the third sensor and the rotation speed of the barrel 10 is rotated faster than the preset reference speed, the controller 240 may apply a current to the first electromagnet 2313 to apply the repulsion to the first magnet 2312, such that the first connection member 221 and the first ring gear 2113 may be coupled with each other.

Therefore, the rotation speed of the rotation shaft S may be changed slower than the rotation speed of the barrel 10 and the rotation speed of the rotation shaft S may be controlled to be within the preset range.

Thereafter, when the rotation speed of the rotation shaft S measured by the first sensor is rotated within the preset reference speed range, as illustrated in FIG. 7, the controller 240 may apply a current to the second electromagnet 2323 to apply the repulsion to the second magnet 2322, such that the second connection member 222 and the second ring gear 2122 may be coupled with each other.

As described above, the second gear set 212 may maintain the rotation speed of the rotation shaft S at a constant speed and therefore the second connection member 222 and the second ring gear 2122 are coupled with each other, such that the rotation speed of the rotation shaft S may be maintained at the preset reference speed.

Further, the second connection member 222 moves in the first direction and at the same time the first connection member 221 also moves in the second direction by the first seesaw member 2341*a* and thus the first connection member 221 may be separated from the first ring gear 2113.

Further, the second connection member 222 moves in the first direction and at the same time the third connection member 223 moves in the second direction by the second seesaw member 2341*b* and thus the third connection member 223 may be separated from the third ring gear 2133.

Further, when the output voltage of the electrostatic generator 30 measured by the second sensor is included in the preset reference voltage, the controller 240 may couple between the second connection member 222 and the second ring gear 2122 to constantly maintain the rotation speed of the rotation shaft S, such that the voltage output from the electrostatic generator 30 may be maintained.

Further, when the rotation speed of the barrel 10 is measured by the third sensor and the rotation speed of the barrel 10 is included in the preset reference speed, the controller 240 may couple between the second connection member 222 and the second ring gear 2122 using the driver 230 and maintain the rotation speed of the rotation shaft S to be within the preset range.

Further, when the rotation speed of the rotation shaft S measured by the first sensor is slower than the preset reference speed, as illustrated in FIG. 8, the controller 240 may apply a current to the third electromagnet 2333 to apply the repulsion to the third magnet 2332, such that the third connection member 223 and the third ring gear 2133 may be coupled with each other.

As described above, the third gear set 213 may accelerate the rotation speed of the rotation shaft S and thus the third connection member 223 and the third ring gear 2133 are coupled with each other, such that the rotation speed of the rotation shaft S may be accelerated at the preset reference speed.

Further, the third connection member 223 moves in the first direction and at the same time the second connection member 222 moves in the second direction by the second seesaw member 2341b and thus the second connection member 222 may be separated from the second ring gear 2122.

Further, when the output voltage of the electrostatic generator 30 measured by the second sensor is lower than the preset reference voltage range, the controller 240 may couple between the third connection member 223 and the third ring gear 2133 to accelerate the rotation speed of the rotation shaft S, such that the voltage output from the electrostatic generator 30 may be increased.

Further, when the rotation speed of the barrel 10 is measured by the third sensor and the rotation speed of the barrel 10 is slower than the preset reference speed, the controller 240 may couple between the third connection member 223 and the third ring gear 2133 using the driver 230 and accelerate the rotation speed of the rotation shaft S to the preset range.

The control of the driver 230 by the controller 240 as described above may be performed in real time together with the sensing by the sensor unit 250.

That is, the rotation speed of the rotation shaft S, the output voltage of the electrostatic generator 30, or the rotation speed of the barrel 10 are measured in real time by the sensor unit 250 and the controller 240 may control the driver 230 to selectively couple the first to third connection members 221, 222, and 223 with the first to third ring gears 2113, 2122, and 2133 depending on the value measured in real time by the sensor unit 250, such that the rotation speed of the rotation shaft S may be maintained to be constant and the electric power produced through the electrostatic generator 30 may also be maintained to be constant.

The foregoing driver 230 may apply the repulsion to the first to third magnets 2312, 2322, and 2332 through the first to third electromagnets 2313, 2323, and 2333 to move the first to third pressing members 2311, 2321, and 2331 in the first direction and at the same time separate the first to third connection members 221, 222, and 223 coupled with the first to third ring gears 2113, 2122, and 2133 using the first and second seesaw members 2341a and 2341b. By doing so, the electric energy required to operate the driver 230 may be minimized.

Further, the driver 230 may include first to third solenoids each coupled with the first to third pressing members 2311, 2321, and 2331, such that the first to third pressing members 2311, 2321, and 2331 may individually move in the first and second directions.

In addition, the configuration of the driver 230 may be replaced by various configurations that the driver 230 may be selectively coupled with the first to third connection members 221, 222, and 223 and the first to third ring gears 2113, 2122, and 2133 and it is preferable to minimize the electric power required to operate the driver 230 to be smaller than the electric power produced through the electrostatic generator 30.

Figure 9:
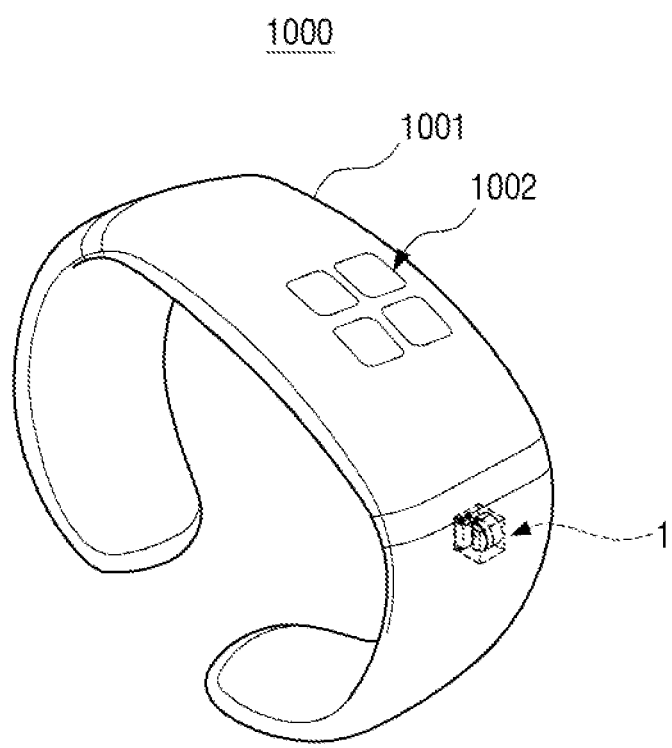
FIG. 9 is a perspective view illustrating a mobile device including the generator according to the exemplary embodiment of the present disclosure.

FIG. 9 is a perspective view illustrating a mobile device 1000 including the generator 1 according to the exemplary embodiment of the present disclosure.

The mobile device 1000 may be a wearable device put on a user's body and for example, as illustrated in FIG. 9, may be a smart watch that may be put on a user's wrist.

However, the mobile device 1000 including the generator 1 according to the exemplary embodiment of the present disclosure may be electronic devices such as a smart phone, a notebook, a wireless earphone, and a tablet PC in addition to the smart watch and for convenience of explanation, FIG. 9 illustrates that the mobile device 1000 is the smart watch, by way of example.

Referring to FIG. 9, the mobile device 1000 may include a main body 1001 including a battery (not illustrated) and the generator 1 may be disposed in the main body 1001.

A display 1002 that may display a screen may be disposed in the main body 1001 of the mobile device 1000 and the display 1002 may further include a touch input (not illustrated) that senses a touch input of a user.

The generator 1 may be connected to the battery of the main body 1001 to transmit the electric power produced through the electrostatic generator 30 to the battery, thereby charging the battery.

For example, the smart watch 1000 coupled with the user's wrist may be shaken by a motion of a user to make the rack gear 41 of the generator reciprocate to thereby rotate the pinion gear 42, such that the barrel 10 is rotated to drive the electrostatic generator 30.

Further, the generator 1 may be directly connected to a printed circuit board on which a plurality of electronic components within the main body 1001 is mounted, thereby directly transmitting electric power to a plurality of electronic components.

The generator 1 is preferably configured to have a size enough to be disposed within the mobile device 1000, the size of the generator 1 may be changed depending on a kind and a size of mobile device 1000 with which the generator 1 is coupled, and the magnitude of the electric power produced by the generator 1 is also changed variously.

As described above, the converter 20 controls the rotation speed of the rotating shaft S constantly, and thus the electrostatic generator 30 of the generator 1 may constantly produce a voltage within the preset range that the user requires.

The voltage within the preset range may be set to be a minimum voltage value that maintains a power supply of the mobile device 1000 even though the battery of the mobile device 1000 is discharged, such that the use time of the mobile device 1000 may be extended.

Further, the battery may be continuously charged by continuously applying the preset voltage to the battery even though the battery is not discharged, and therefore the use time of the mobile device 1000 may be extended.

As such, the generator 1 according to the exemplary embodiment of the present disclosure is coupled with the mobile device 1000, thereby producing the electric power using the movement of the generator 1 by the user as the driving power.

Figure 10:
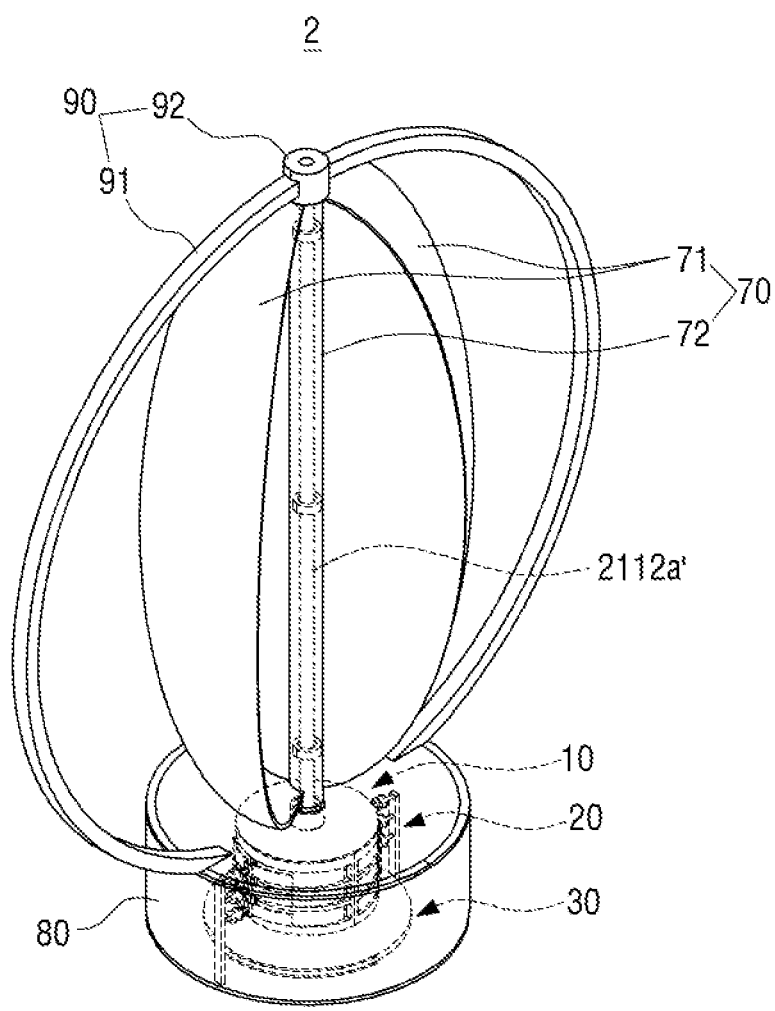
FIG. 10 is a perspective view illustrating a generator according to another exemplary embodiment of the present disclosure.
Figure 11:
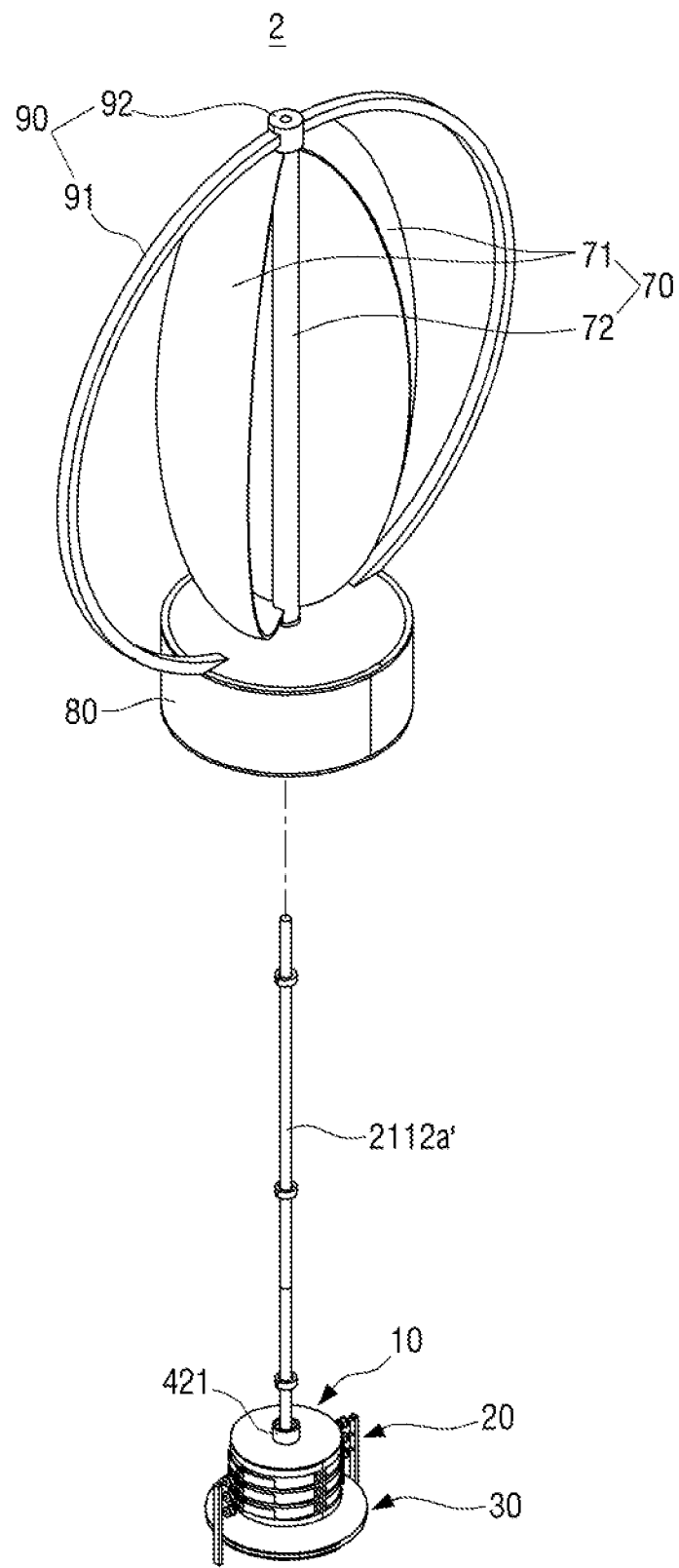
FIG. 11 is an exploded perspective view of the generator illustrated in FIG. 10.

FIG. 10 is a perspective view of a generator 2 according to another exemplary embodiment of the present disclosure and FIG. 11 is an exploded perspective view of the generator 2 illustrated in FIG. 10.

Hereinafter, the generator 2 according to another exemplary embodiment of the present disclosure will be described with reference to FIGS. 10 and 11.

Referring to FIGS. 10 and 11, the generator 2 includes the barrel 10, the converter 20, the electrostatic generator 30, an impeller 70, a third case 80, and an impeller support part 90.

Among the components of the generator 2 according to another exemplary embodiment of the present disclosure, the structure of the barrel 10, the converter 20, and the electrostatic generator 30 is the same as that of the generator 1 according to the exemplary embodiment of the present disclosure described with reference to FIGS. 1 to 9, and therefore the overlapping description thereof will be omitted. Therefore, the difference from the generator 1 according to the exemplary embodiment of the present disclosure will be described mainly.

The barrel 10, the converter 20, and the electrostatic generator 30 are disposed within the third case 80.

The impeller 70 may include a pair of blades 71 and an impeller shaft 72 coupled with the pair of blades 71 and one end of the impeller shaft 72 may be connected to the barrel 10 through the coupler 421.

Further, as illustrated in FIGS. 10 and 11, the third case 80 may be coupled with the impeller support part 90 that supports the impeller 70.

The impeller support part 90 includes ring parts 91 that have approximately a ring shape to be coupled with the third case 80 and a rotation support part 92 to which the other end of the impeller shaft 72 is rotatably supported.

The impeller 70 is rotatably disposed between the ring parts 91 and may be rotated with respect to the impeller shaft 72 by applying driving power such as external wind power and water power of the generator 2 to the pair of blades 71. As a result, the barrel 10 may be rotated and the electric power may be produced through the electrostatic generator 30.

Further, the plurality of first planetary gears 2112 configuring the first gear set 211 may be rotatably coupled with one end of a first carrier 2112a' and as illustrated in FIGS. 10 and 11, the other end opposite to one end of the first carrier 2112a' sequentially penetrates through the barrel 10, the coupler 421, and the impeller shaft 72 to be extended along the longitudinal direction to be fixed to the rotation support part 92. As a result, if the first ring gear 2113 is rotated, the plurality of first planetary gears 2112 may be rotated with respect to each rotation center.

The foregoing structure of the impeller 70 may be changed to various conventional propeller structures that may be rotated depending on the external wind power and water power, and thus the structure of the impeller support part 90 may also be changed variously.

The generator 2 according to another exemplary embodiment of the present disclosure may rotate the rotation shaft S at a constant speed by the converter 20 even though the external wind power or water power moves irregularly and thus the impeller 70 is rotated irregularly. Therefore, the constant electric power may be uniformly produced through the electrostatic generator 30.

Further, the generator 2 may be configured to have various sizes. For example, the generator 2 is configured to have the same size as the existing large wind generator, thereby uniformly producing large-capacity electric power.

Further, the generator 2 may be manufacture at a size enough to be attached to a bicycle or an outside of a vehicle, and thus uses air resistance of the bicycle or the vehicle as driving power to uniformly produce electric power.

In addition, the generator 2 may be coupled with the mobile device such as an action cam widely used recently, and thus uses the air resistance depending on the motion of the user as the driving power, thereby producing the uniform electric power.

Figure 12:
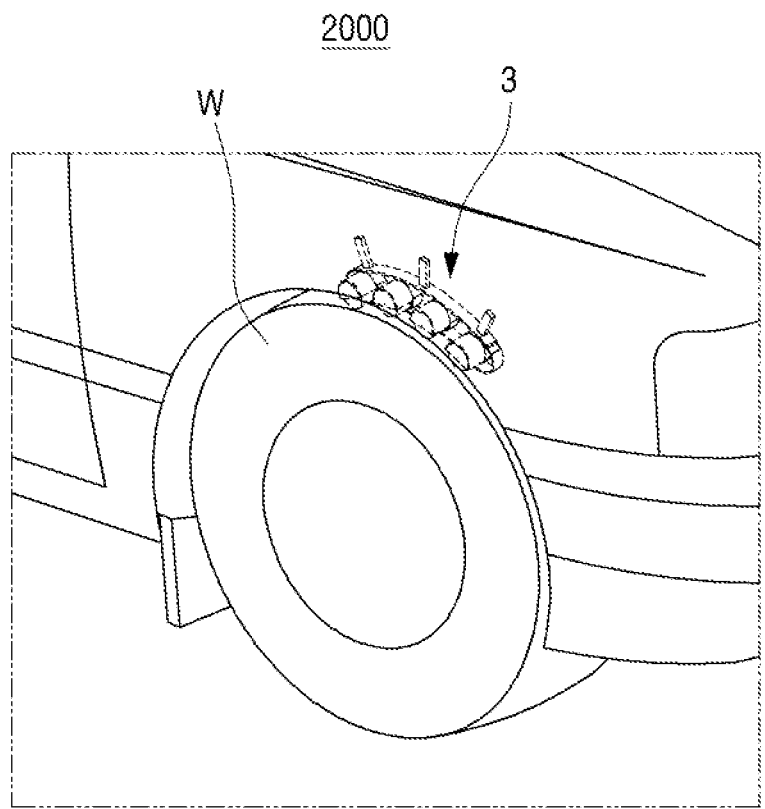
FIG. 12 is a perspective view of a part of a vehicle with which a generator according to still another exemplary embodiment of the present disclosure is coupled.
Figure 13:
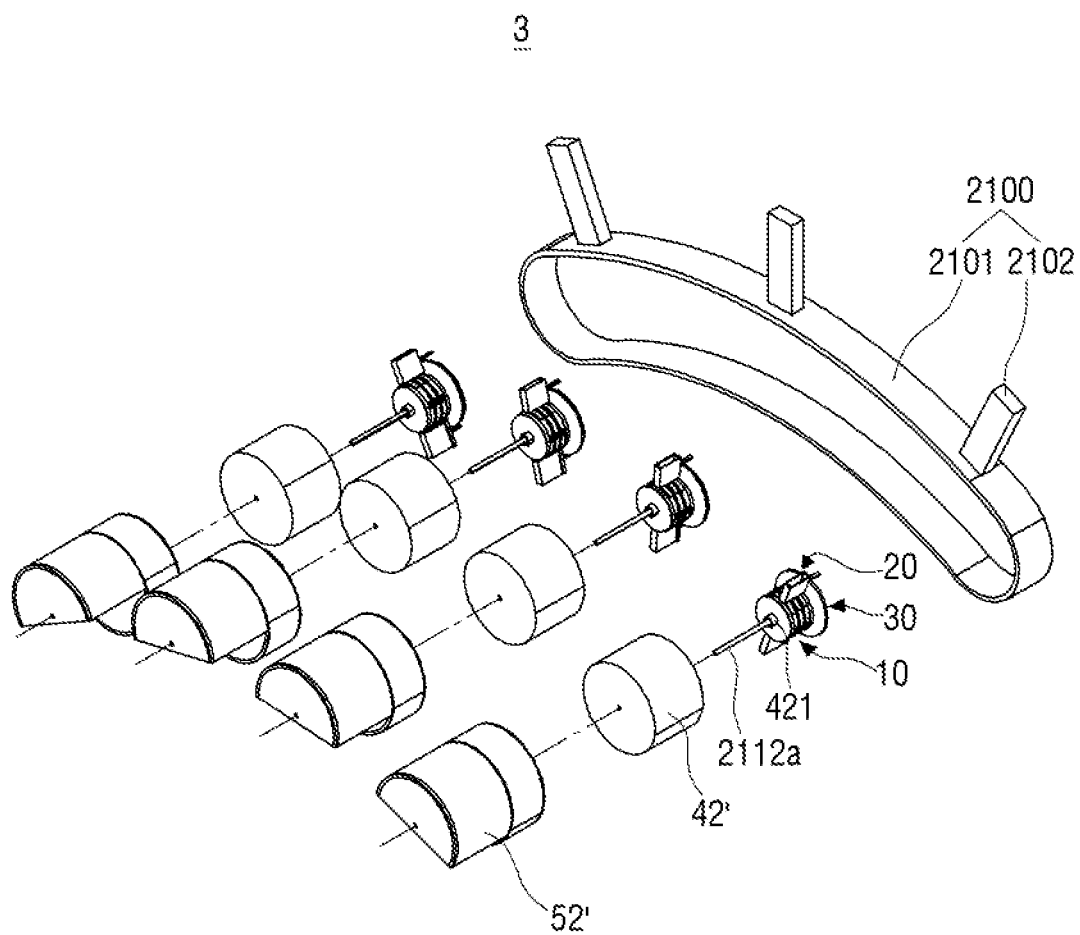
FIG. 13 is an exploded perspective view of the generator illustrated in FIG. 12.

FIG. 12 is a perspective view illustrating a portion of a vehicle 2000 with which the generator 3 according to another exemplary embodiment of the present disclosure is coupled and FIG. 13 is an exploded perspective view of the generator 3 illustrated in FIG. 12.

Hereinafter, a generator 3 according to another exemplary embodiment of the present disclosure will be described with reference to FIGS. 12 and 13.

Among the components of the generator 3 according to another exemplary embodiment of the present disclosure, the structure of the barrel 10, the converter 20, and the electrostatic generator 30 is the same as that of the generator 1 according to the exemplary embodiment of the present disclosure described with reference to FIGS. 1 to 9, and therefore the overlapping description thereof will be omitted. Hereinafter, the difference from the generators 1 and 2 according to the exemplary embodiment of the present disclosure will be described mainly.

Referring to FIGS. 12 and 13, the generator 3 according to another exemplary embodiment of the present disclosure may be coupled with the vehicle 2000 to contact a wheel W of the vehicle 2000 to be directly applied with a torque from the wheel W, thereby driving the electrostatic generator 30.

In detail, in the generator 3, the barrel 10, the converter 20, and the electrostatic generator 30 are configured in plural and the plurality of barrels 10, converters 20, and electrostatic generators 30 may be coupled and supported to a generator support member 2100.

The generator support member 2100 may include a ring part 2101 to which the plurality of barrels 10, converters 20, and electrostatic generators 30 are fixed and a plurality of fixed parts 2012 coupled on the plurality of ring parts 2101, in which the plurality of fixed parts 2102 are coupled with the vehicle 2000 and thus the generator 3 may be fixed to the vehicle 2000.

Each coupler 421 of the plurality of barrels 10 is coupled with a plurality of friction rollers 42' contacting the wheel W.

The friction roller 42' may be applied with a torque from the rotating wheel W to rotate the barrel 10 and may preferably be made of a metal material to increase a friction force with the wheel W made of a rubber material.

Further, the plurality of friction rollers 42' may be disposed along an outer circumferential surface of the wheel W at a predetermined interval.

Further, the generator support member 2100 is coupled with a suspension (not illustrated) of the vehicle 2000 and thus may move corresponding to the movement of the wheel W depending on the driving of the vehicle 2000, such that the friction roller 42' may continuously contact the outer circumferential surface of the wheel W upon the driving of the vehicle 2000.

Further, the plurality of barrels 10, converters 20, electrostatic generators 30, and friction rollers 42' may each disposed within a plurality of fourth cases 52' and the fourth case 52' includes an opening opened to contact the friction roller 42' with the wheel W.

By doing so, if the wheel W of the vehicle 2000 is rotated, the plurality of friction rollers 42' contacting the outer circumferential surface of the wheel W are rotated, and thus the plurality of barrels 10 may be rotated, such that the plurality of electrostatic generators 30 may be driven to produce the constant electric power.

The electric power produced by the generator 3 according to another exemplary embodiment of the present disclosure may be used as an auxiliary power supply for various electronic devices within the vehicle 200 and the electric power may be transmitted to the battery of the vehicle 200 to charge the battery.

The generators 1 to 3 according to various exemplary embodiments of the present disclosure as described above may be applied to the foregoing mobile device, various devices using electric power in addition to the vehicle, or the like and may constantly supply the uniform electric power to various devices.

The generators 1 to 3 according to various embodiments of the present disclosure use energy existing around the generators 1 to 3 as driving power to produce the uniform electric power, and therefore has an advantage in the utilization of energy and the environment.

Hereinabove, various exemplary embodiments of the present disclosure are individually described, but each exemplary embodiment need not necessarily be implemented alone and therefore the configurations and operations of each exemplary embodiment may also be implemented in combination with at least one other exemplary embodiment.

Although the preferred exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A generator, comprising:
   a barrel rotated by being applied with driving power from the outside;
   a converter applied with a torque of the barrel to rotate a rotating shaft at a constant rotation speed; and
   an electrostatic generator driven by being applied with the torque from the rotation shaft,
   wherein the converter includes:
      a plurality of gear sets disposed within the barrel to be connected to the rotation shaft and having different gear ratios; and
      a plurality of connection members selectively connecting between any one of the plurality of gear sets and the barrel.

2. The generator as claimed in claim 1, wherein the plurality of gear sets include first and second gear sets, the first gear set includes a first sun gear coupled with the rotation shaft, a plurality of first planetary gears meshed with the first sun gear, and a first ring gear meshed with the plurality of first planetary gears, and the second gear set includes a second sun gear coupled with the rotation shaft and a second ring gear meshed with the second sun gear.

3. The generator as claimed in claim 2, wherein the first and second ring gears are an internal gear having the same diameter and the first sun gear, the second sun gear, and the first planetary gear are a spur gear having different diameters and
   wherein the first gear set includes a first carrier with which the plurality of first planetary gears each are rotatably coupled and the first carrier is fixed to an outside of the barrel.

4. The generator as claimed in claim 3, wherein the plurality of gear sets further include a third gear set including a third sun gear coupled with the rotation shaft, a plurality of third planetary gears meshed with the third sun gear, and a third ring gear meshed with the plurality of third planetary gears, the third ring gear is an internal gear having the same diameter as the first and second ring gears, and the third sun gear and the third planetary gear are a spur gear having a diameter different from that of the first sun gear, the second sun gear, and the first planetary gear.

5. The generator as claimed in claim 2, wherein the plurality of connection members include first and second connection members coupled with the barrel and the first and second connection members move in a first direction toward the rotation shaft to be coupled with the first and second ring gears and move in a second direction opposite to the first direction to be separated from the first and second ring gears.

6. The generator as claimed in claim 5, wherein the first and second connection members each include coupling grooves corresponding to shapes of outer circumferential portions of the first and second ring gears.

7. The generator as claimed in claim 6, wherein the barrel has a cylindrical shape and includes a plurality of slots formed on an outer circumferential surface thereof and the plurality of slots each are movably inserted with the first and second connection members in the first direction and the second direction.

8. The generator as claimed in claim 6, wherein the first connection member is configured in plural to be disposed along the outer circumferential surface of the barrel at the same interval and the second connection member is configured in plural to be disposed along the outer circumferential surface of the barrel at the same interval.

9. The generator as claimed in claim 6, wherein the first and second gear sets are made of a metal material and the first and second connection members are made of a urethane material and fitted in the outer circumferential portions of the first and second ring gears, respectively.

10. The generator as claimed in claim 5, wherein the converter further includes a driver applying a force to the first and second connection members so that the first and second connection members move in different directions.

11. The generator as claimed in claim 10, wherein the driver includes:
    first and second magnets coupled with the first and second connection members, respectively; and
    first and second electromagnets applying a magnetic force to the first and second magnets.

12. The generator as claimed in claim 10, wherein the driver includes:
    first and second pressing members moving in the first direction to press the first and second connection members;
    first and second magnets coupled with the first and second pressing members;

first and second electromagnets applying a magnetic force to the first and second magnets;

first and second elastic members applying a force to the first and second pressing members so that the first and second pressing members moving in the first direction return to the second direction; and a first seesaw member whose both ends are pivotably connected to the first and second connection members and the seesaw member applies a force to the other of the first and second connection members in a direction opposite to a direction of a force applied to any one of the first and second connection members.

13. The generator as claimed in claim 12, wherein the plurality of gear sets further include a third gear set that includes a third sun gear coupled with the rotation shaft, a plurality of third planetary gears meshed with the third sun gear, and a third ring gear meshed with the plurality of third planetary gears, the plurality of connection members further includes a third connection member that moves in the first direction while being coupled with the barrel to be coupled with the third ring gear and moves in the second direction to be separated from the third ring gear, and the driver further includes a second seesaw member whose both ends are pivotably connected to the second and third connection members.

14. The generator as claimed in claim 10, wherein the converter includes:
a first sensor measuring the rotation speed of the rotation shaft; and
a controller controlling the driver to rotate the rotation shaft at a constant rotation speed depending on the rotation speed measured by the first sensor.

15. The generator as claimed in claim 14, wherein the converter further includes a second sensor measuring an output voltage of the electrostatic generator and the controller controls the driver depending on an output voltage measured by the second sensor.

16. The generator as claimed in claim 1, further comprising:
a case;
a rack gear disposed within the case;
a swing member movably supporting the rack gear; and
a pinion gear coupled with the barrel to be meshed with the rack gear.

17. The generator as claimed in claim 1, further comprising:
a driving shaft coupled with the barrel; and
an impeller connected to the driving shaft.

18. The generator as claimed in claim 1, wherein the electrostatic generator includes:
a first charging plate rotated while being coupled with the rotation shaft and including a plurality of first charged bodies disposed on one surface thereof; and
a second charging plate whose one surface is provided with a plurality of second charged bodies disposed to contact or be adjacent to the plurality of first charged bodies.

19. A mobile device, comprising:
a main body including a battery; and
a generator disposed within the main body to apply electric power to the battery,
wherein the generator includes:
a barrel rotated by being applied with a driving force from the main body shaken by an external force;
a converter applied with a torque of the barrel to rotate a rotating shaft at a constant rotation speed; and
an electrostatic generator driven by being applied with the torque from the rotation shaft, and
wherein the converter includes:
a plurality of gear sets disposed within the barrel to be connected to the rotation shaft and having different gear ratios; and
a plurality of connection members selectively connecting between any one of the plurality of gear sets and the barrel.

* * * * *